United States Patent
Tan

(10) Patent No.: US 9,524,447 B2
(45) Date of Patent: Dec. 20, 2016

(54) SEARCHING 2D IMAGE BASED ON TRANSFORMED 1D DATA MATCHING

(71) Applicant: Sizhe Tan, Berkeley, CA (US)

(72) Inventor: Sizhe Tan, Berkeley, CA (US)

( * ) Notice: Subject to any disclaimer, the term of this patent is extended or adjusted under 35 U.S.C. 154(b) by 379 days.

(21) Appl. No.: 13/999,523

(22) Filed: Mar. 5, 2014

(65) Prior Publication Data

US 2015/0254525 A1  Sep. 10, 2015

(51) Int. Cl.
| | |
|---|---|
| *G06K 9/00* | (2006.01) |
| *G06K 9/62* | (2006.01) |
| *G06K 9/68* | (2006.01) |
| *G06K 9/46* | (2006.01) |

(52) U.S. Cl.
CPC ......... *G06K 9/6202* (2013.01); *G06K 9/00496* (2013.01); *G06K 9/46* (2013.01); *G06K 9/6211* (2013.01); *G06K 9/6232* (2013.01); *G06K 9/6878* (2013.01)

(58) Field of Classification Search
CPC .. G06K 9/00208; G06K 9/00496; G06K 9/46; G06K 9/4633; G06K 9/6202; G06K 9/6211; G06K 9/6232; G06K 9/6878; G06F 17/30247; G06T 9/00; G06T 9/005
USPC ......................................... 382/181, 197, 276
See application file for complete search history.

(56) References Cited

U.S. PATENT DOCUMENTS

| | | | | |
|---|---|---|---|---|
| 5,159,644 | A * | 10/1992 | Martin | G06K 9/6202 382/161 |
| 5,926,556 | A * | 7/1999 | Douglas | G06K 7/10722 382/293 |
| 6,400,828 | B2 * | 6/2002 | Covell | G06K 9/00281 382/181 |
| 7,147,159 | B2 | 12/2006 | Longacre, Jr. et al. | |
| 7,680,330 | B2 * | 3/2010 | Leung | G06K 9/4676 382/181 |
| 7,690,572 | B2 | 4/2010 | Meier et al. | |
| 8,587,823 | B2 | 11/2013 | Kajihara et al. | |
| 8,611,649 | B2 | 12/2013 | Jia | |
| 8,611,673 | B2 | 12/2013 | Aarabi et al. | |
| 8,634,654 | B2 | 1/2014 | van Zwol et al. | |
| 2005/0074177 | A1 * | 4/2005 | Ichimura | H04N 19/63 382/240 |
| 2008/0193035 | A1 * | 8/2008 | Szajnowski | G06T 7/401 382/260 |
| 2009/0167884 | A1 * | 7/2009 | Connell, Jr. | H04N 5/335 382/181 |

(Continued)

*Primary Examiner* — Eric Rush
(74) *Attorney, Agent, or Firm* — Suganda Jutamulia

(57) ABSTRACT

A reference 2D data is provided. The reference 2D data comprises a first plurality of pixels defined in 2D coordinates. The reference 2D data is transformed into a reference 1D data having a first 1D size. The reference 1D data comprises the first plurality of pixels in a transformed 1D order. A plurality of input 2D data are also provided. An input 2D data comprises a second plurality of pixels defined in 2D coordinates. The plurality of input 2D data are transformed into a plurality of input 1D data, which comprises transforming the input 2D data into an input 1D data. Transforming the input 2D data into the input 1D data is the same as transforming the reference 2D data into the reference 1D data. Finally, a transformed input 1D data from the plurality of input 1D data that matches the transformed reference 1D data is searched.

15 Claims, 22 Drawing Sheets

(56) References Cited

U.S. PATENT DOCUMENTS

2009/0190834 A1* 7/2009 Inoue ................. G06K 9/00221
382/181
2010/0166321 A1* 7/2010 Sawant ................. G06K 9/522
382/209

* cited by examiner

SEARCHING 2D IMAGE BASED ON TRANSFORMED 1D DATA MATCHING

FIELD OF THE INVENTION

This invention relates to methods for searching 2D image and more specifically to methods for searching 2D image based on transformed 1D data matching to significantly reduce steps of computation.

BACKGROUND OF THE INVENTION

An image typically shows variation of a value or a combination of values over a 2D array. An image can be a regular color picture taken by a camera, an X-ray picture, an infrared picture, an ultrasound picture, etc. There are few reported efficient and systematic way to search an image (e.g., a human face) that includes a specific sub-image of interest (e.g., an eye) embedded in the image, which is stored in a stack of images (e.g., various pictures).

The image search system is used to find an image or images that contain a specific pattern. For example, a user may inquire what maps (images) contain a specific landmark such as the Golden Gate bridge. The query (sub-image) may be in the form of a picture of the Golden Gate bridge. The image document search system will output a number of maps (images) that contain picture of the Golden Gate bridge.

In another example, a collection of millions of satellite pictures are provided. A picture is then randomly picked up from the collection. The picture is cut into pieces. A piece of the picture is used as a reference (sub-image) or a query. The image search system will be able to find the original picture (image) to which the piece belongs, in a collection of millions pictures, and locate the position of that piece in the found picture (image).

To the inventor's knowledge, all 2D image search methods are based on a 2D matching operation, which may be a kin to the 2D correlation. If the size of sub-image is (m×n), and the size of image is (M×N), to complete a 2D matching operation between an image and a sub-image, it may take approximately (M×N)×(m×n) steps of computations. To match thousands of images, thousands of (M×N)×(m×n) steps of computations are needed. Accordingly, methods for 2D matching requiring less steps of computations are desired. Methods for searching 2D image that includes a sub-image requiring less steps of computations are desired as well.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
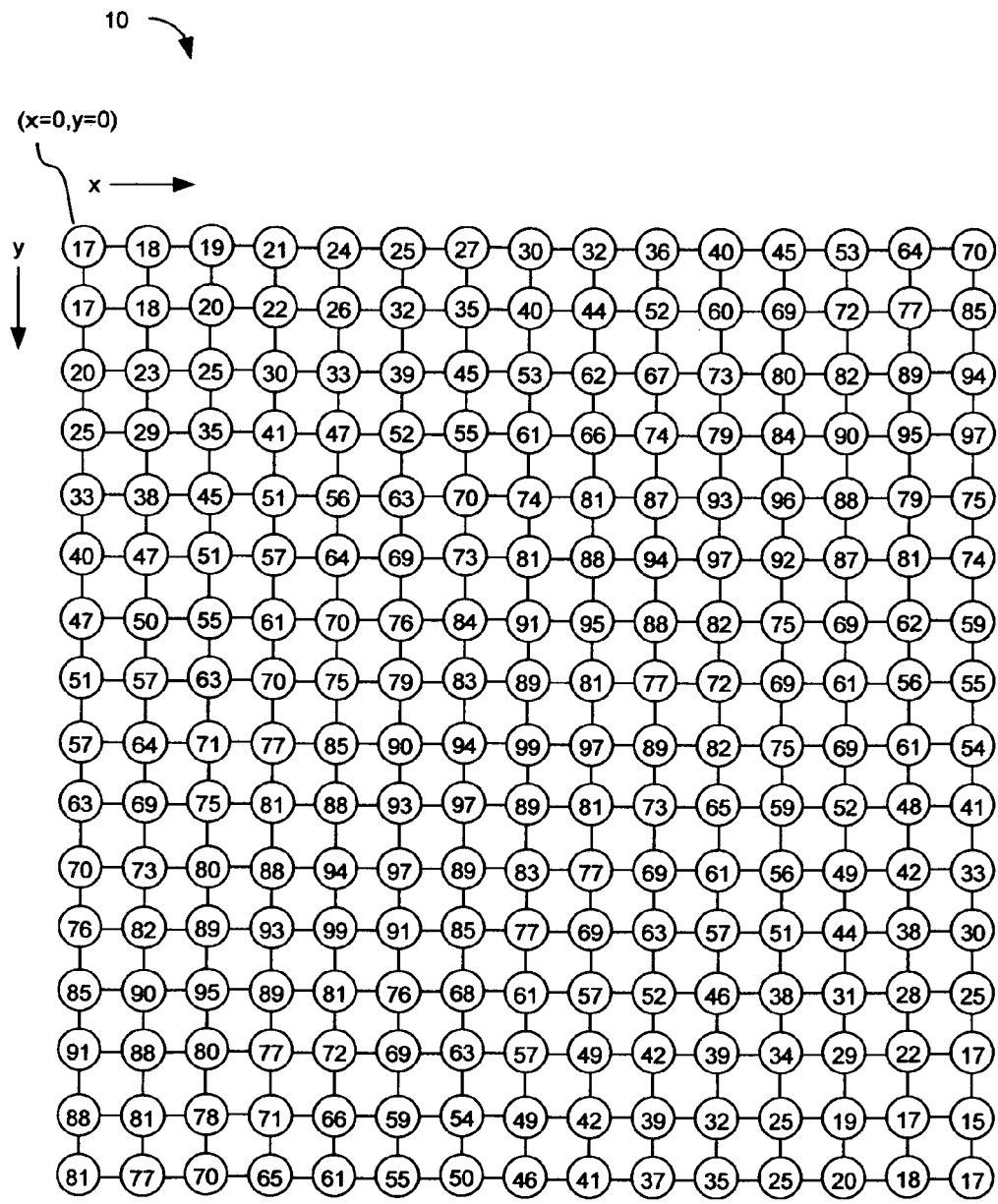
FIG. 1 illustrates a typical input 2D data.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

2D Image Matching

FIG. 1 illustrates a typical input 2D data 10, according to the present invention. For example, input 2D data 10 is a digitized image. The digitized image comprises a plurality of pixels, each pixel has a value or a plurality of values. For example, each pixel has a brightness value, which is illustrated in FIG. 1 inside the circle representing pixel. In some implementation (not shown), each pixel may have a plurality of values, for example, R (red signal), G (green signal), and B (blue signal) values. In yet another implementation (not shown), each pixel may have other values or features that represent the pixel.

Figure 2:
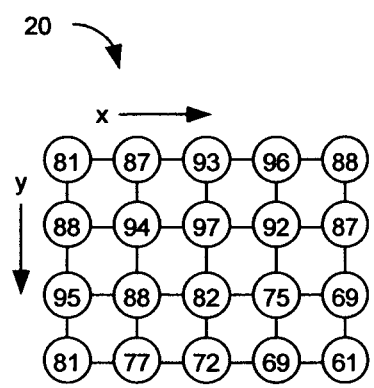
FIG. 2 illustrates a reference 2D data.
Figure 3:
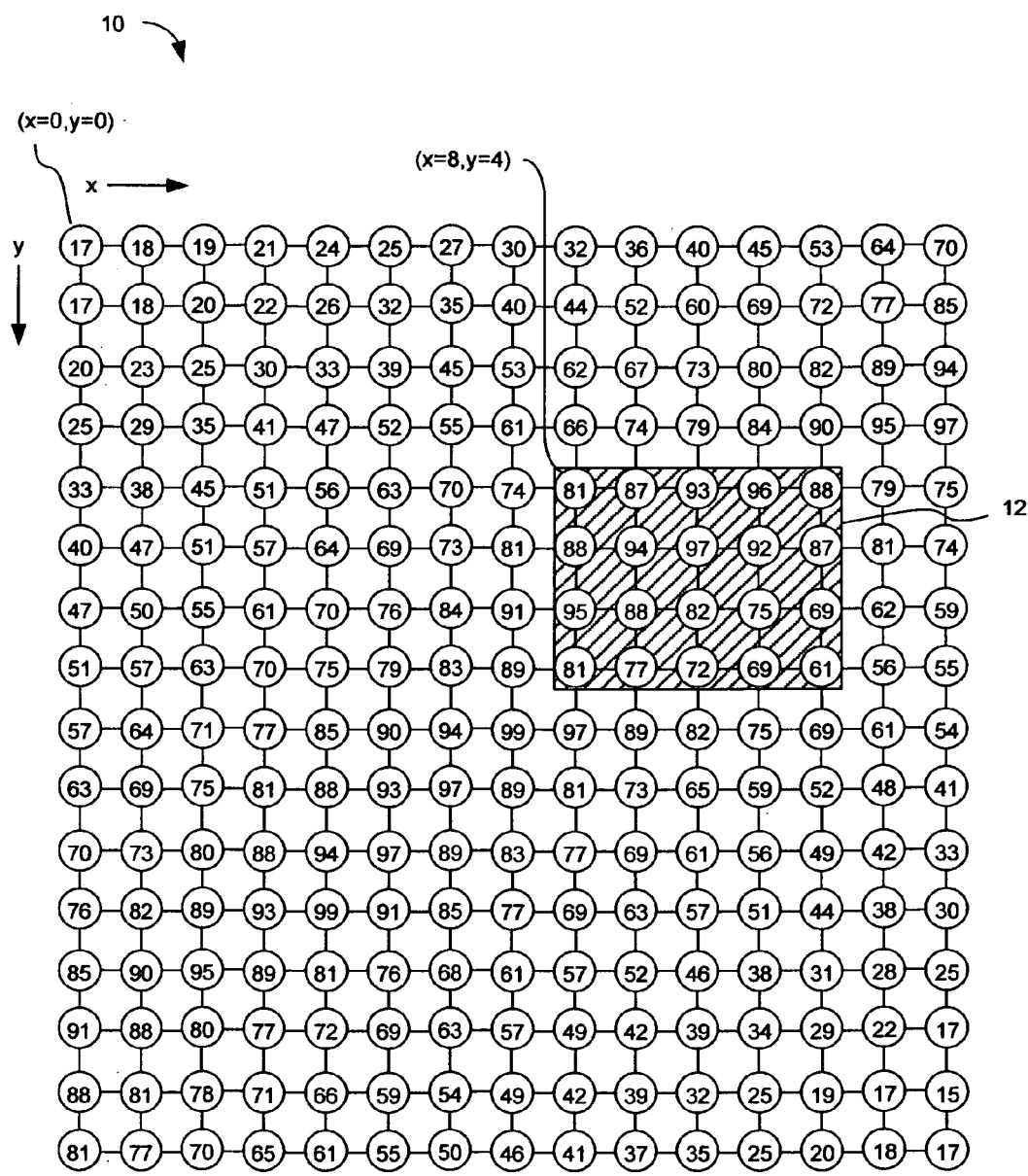
FIG. 3 illustrates an input 2D data matching a reference 2D data at a position.

Input 2D data 10, which may be an image, is searched whether it includes a reference 2D data 20, which may be a sub-image, as shown in FIG. 2, according to the present invention. Traditionally, input 2D data 10 is correlated with reference 2D data 20. Alternatively, other 2D matching operations may be performed. If the size of input 2D data 10 is (M×N) and the size of reference 2D data 20 is (m×n), the 2D matching operation will require approximately (M×N)×(m×n) steps of computation, providing M, N, m, and n are relatively large. For example, as a result of the 2D matching operation, a portion 12 of input 2D data, which is represented by a shaded area in FIG. 3, matches reference 2D data 20. For example, the upper left corner of portion 12 is positioned at (x=8,y=4).

Figure 4:
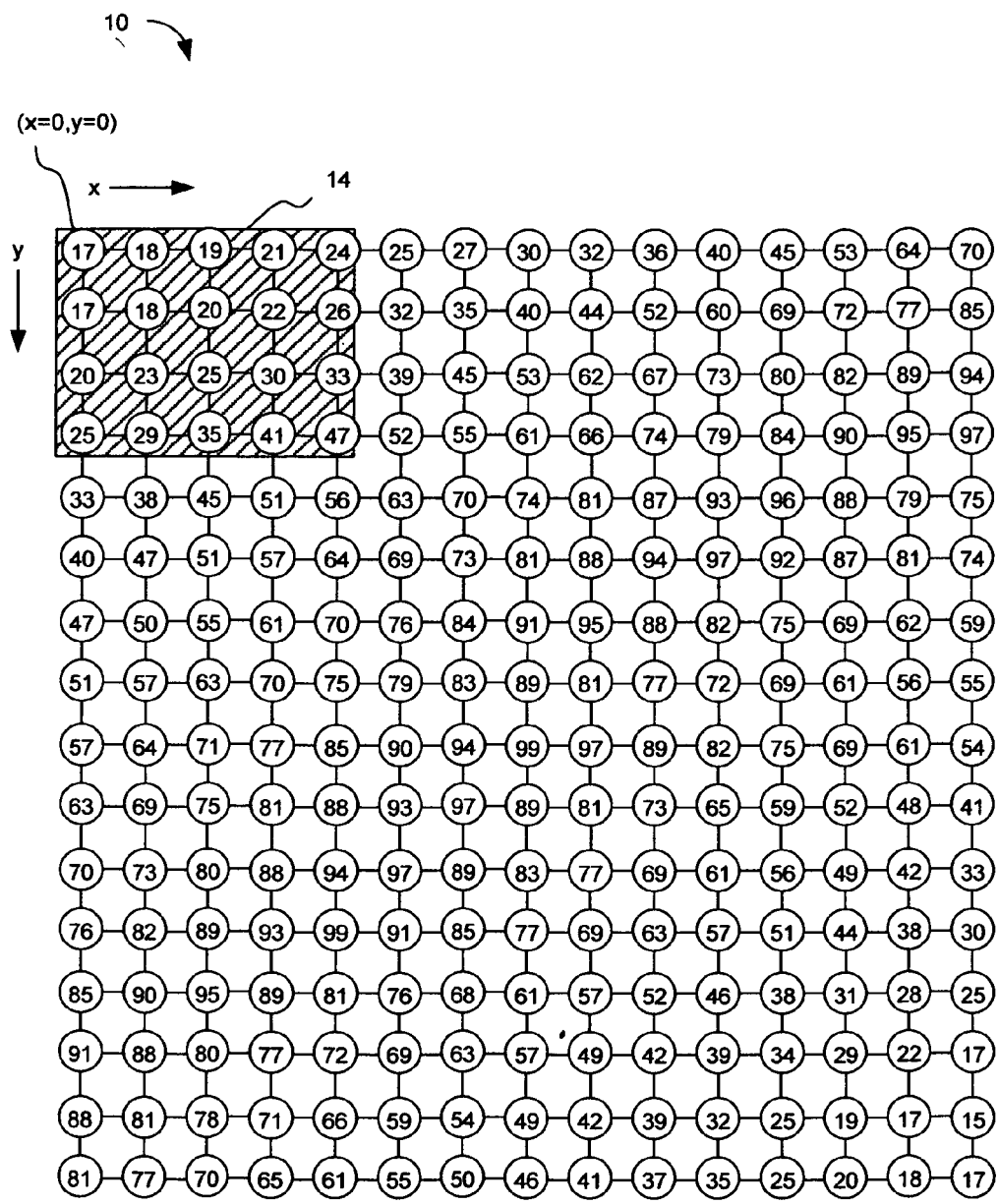
FIG. 4 illustrates that an input 2D data is calculated whether it matches a reference 2D data at a position.
Figure 5:
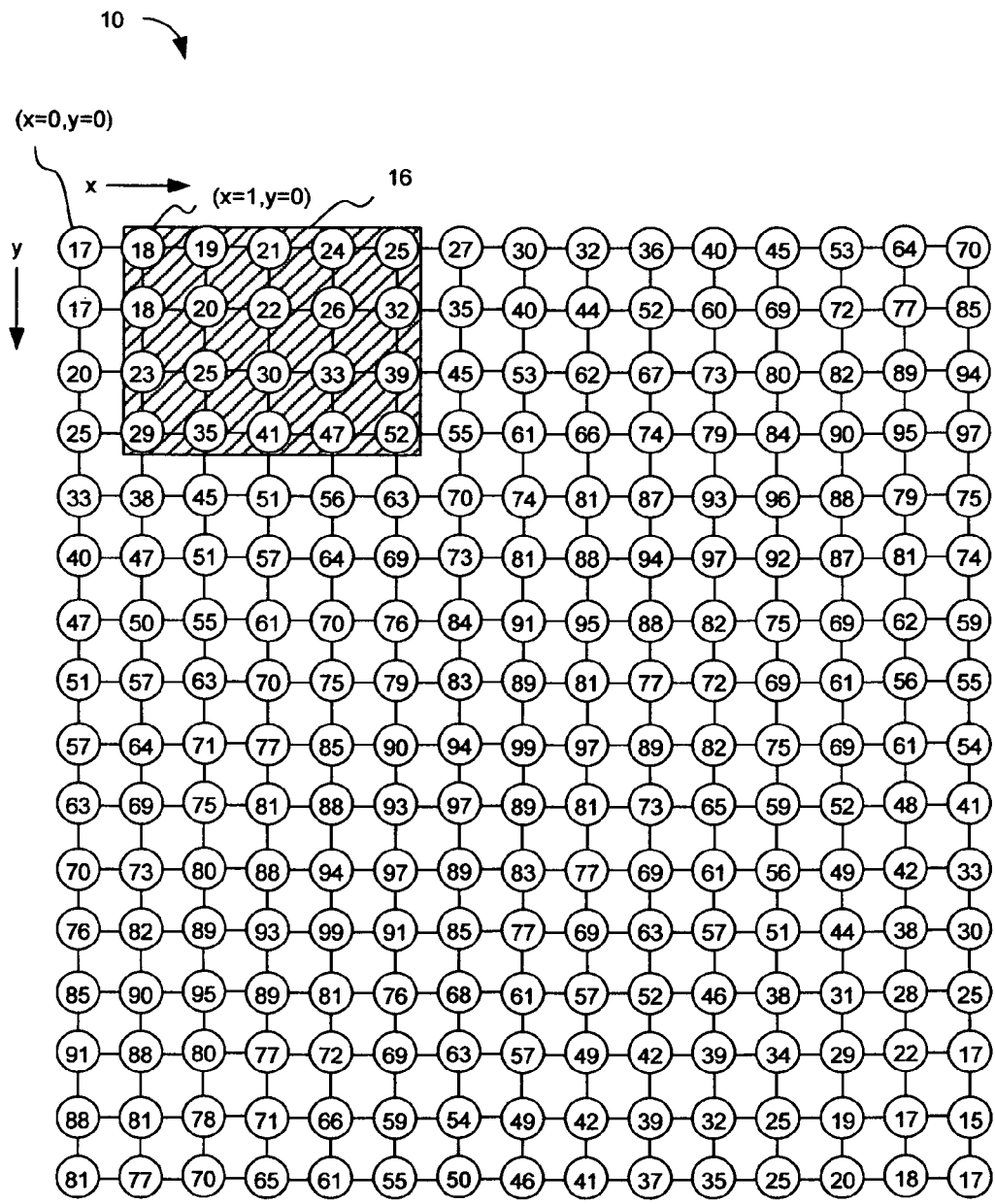
FIG. 5 illustrates that an input 2D data is calculated whether it matches a reference 2D data at another position.
Figure 6:
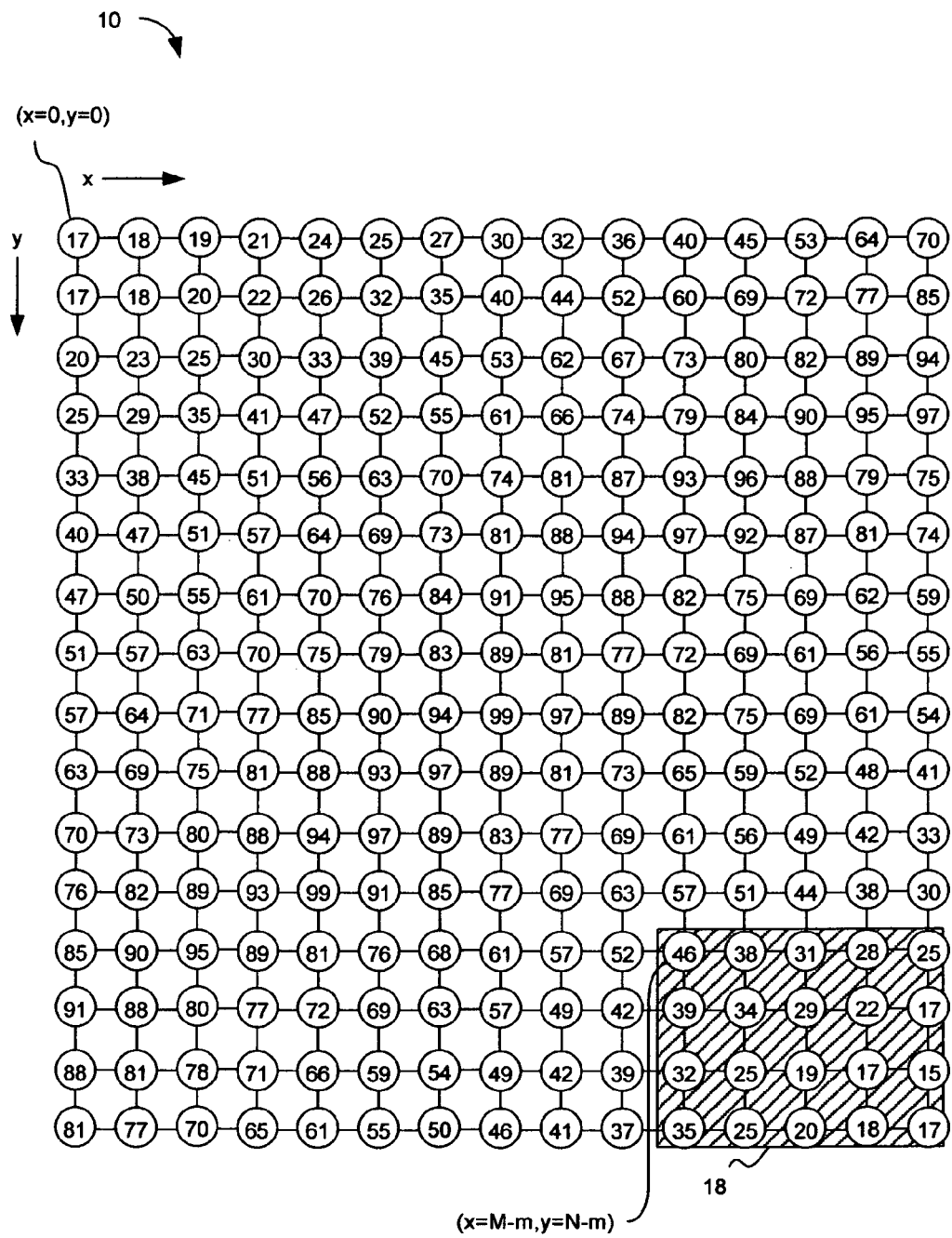
FIG. 6 illustrates that an input 2D data is calculated whether it matches a reference 2D data at yet another position.

In a typical 2D matching operation, a portion 14 of (m×n) size having an upper left corner at (x=0,y=0) is calculated whether it matches reference 2D data 20 of (m×n) size, as shown in FIG. 4. If portion 14 does not match reference 2D data 20, the operation is moved one pixel to the right, such that a portion 16 of (m×n) size having an upper left corner at (x=1,y=0) is calculated whether it matches reference 2D data 20 of (m×n) size, as shown in FIG. 5. The matching operation is repeated until a portion 18 of (m×n) size having an upper left corner at (x=M−m,y=N−n) is calculated, as shown in FIG. 6. An input 2D data matches a reference 2D data if the value of most pixels of the reference 2D data matches the value of the corresponding pixels of the input 2D data. From the process shown in FIG. 4 to FIG. 6, it may take approximately (M×N)×(m×n) steps of computations, for m<<M and n<<N.

1D Data Transformed from 2D Data

Figure 7:
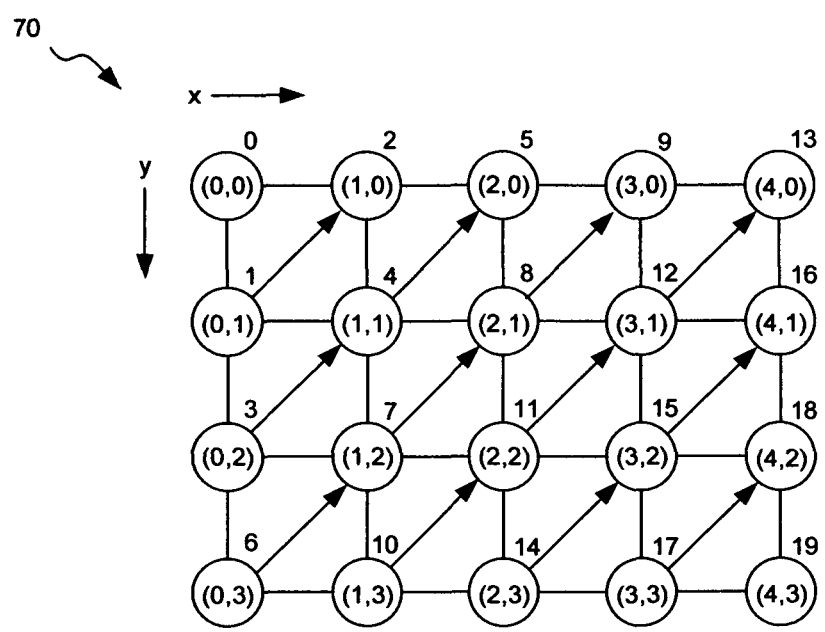
FIG. 7 is a reference 2D data.
Figure 8:
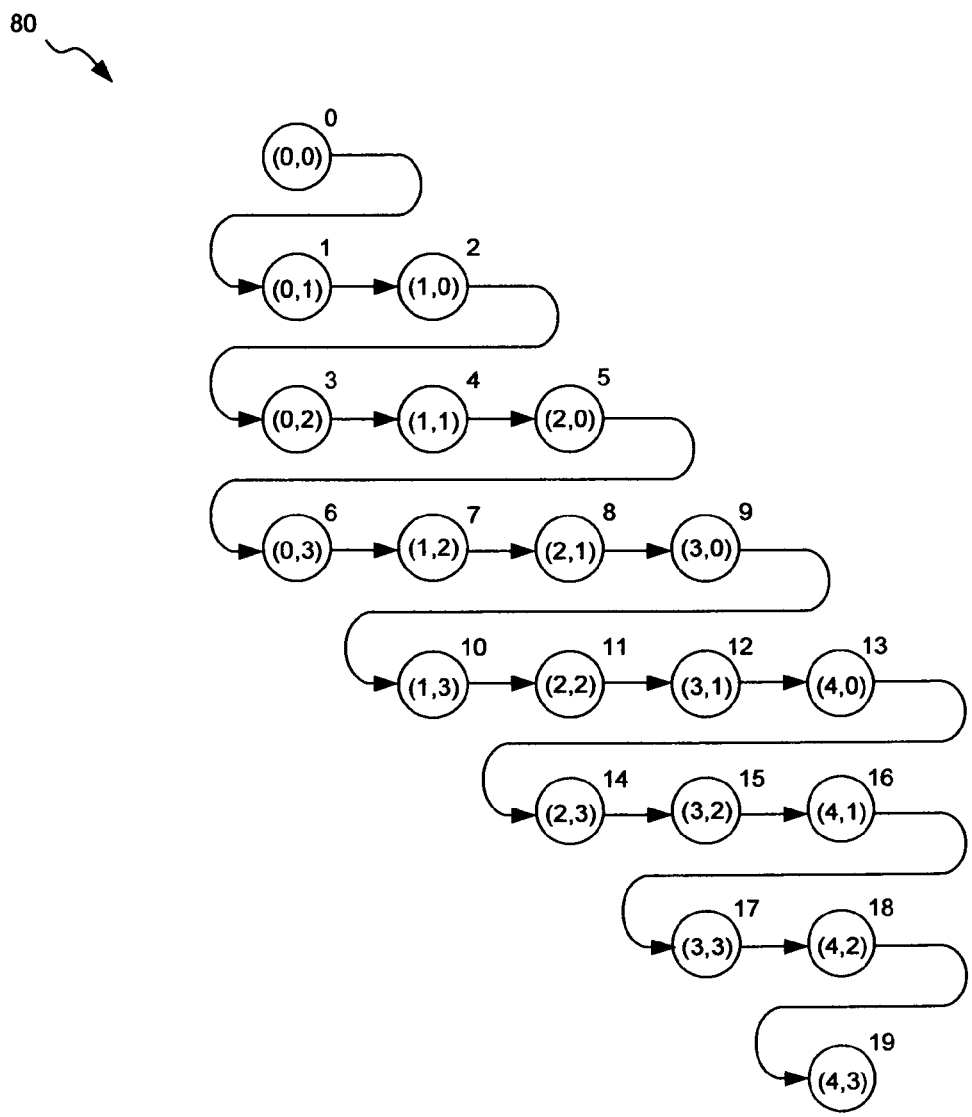
FIG. 8 is a reference 1D data transformed from reference 2D data of FIG. 7.

In contrast, computer methods and embodiments for 2D data matching that do not require approximately (M×N)×(m×n) steps of computation are described in the following, according to the present invention. An embodiment is illustrated in FIG. 7 according to the present invention. FIG. 7 shows a reference 2D data 70, which may be a sub-image, having 2D size of (m×n), according to the present invention. Reference 2D data 70 is transformed into a reference 1D data 80 having 1D size or length of (l=m×n) as shown in FIG. 8, according to the present invention. An original position (x,y) in the 2D data is indicated in the circle representing a pixel.

Reference 2D data 70 is transformed into reference 1D data 80 by selecting pixels in a transformed 1D order comprising rules: (1) starting from (x=0,y=0); (2) moving one pixel down to (x=0,y=1); (3) moving diagonally one pixel up and one pixel right to (x=1,y=0); (4) moving back to (x=0,y=2), one pixel down from (x=0,y=1); (4) repeating the same procedure until no more pixel under the pixel (x=0,y=n−1); (5) moving back to (x=1,y=n−1); (6) repeating the same procedure until the last pixel (x=m−1,y=n−1); as shown in FIG. 7, according to the present invention.

Mathematically, the rules may be expressed as follow.

Steps 1-$n$: $0 \leq i \leq (n-1)$, select $x=0$ and $y=i-x$; $x=1$ and $y=i-x$; $x=2$ and $y=i-x$; ... ; until $y=0$; $i$: integer. Rule (1)

Steps $(n+1)$-$(n+m-1)$: $1 \leq j \leq (m-1)$, select $x=j$ and $y=m-x+j-2$; $x=j+1$ and $y=m-x+j-2$; $x=j+2$ and $y=m-x+j-2$; ... until $x=m-1$; $j$: integer. Rule (2)

For reference 2D data having 2D size of (m,n).

For example, the transformed reference 1D data 80 includes: step 1: pixel 0, which is (0,0); step 2: pixel 1, which is (0,1); pixel 2, which is (1,0); step 3: pixel 3, which is (0,2); pixel 4, which is (1,1); pixel 5, which is (2,0); step 4: pixel 6, which is (0,3); pixel 7, which is (1,2); pixel 8, which is (2,1); pixel 9, which is (3,0); step 5: pixel 10, which is (1,3); pixel 11, which is (2,2); pixel 12, which is (3,1); pixel 13, which is (4,0); step 6: pixel 14, which is (2,3); pixel 15, which is (3,2); pixel 16, which is (4,1); step 7: pixel 17, which is (3,3); pixel 18, which is (4,2); and step 8: pixel 19, which is (4,3). The pixel number is indicated at the right upper corner of each pixel as shown in FIGS. 7 and 8, according to the present invention. The parenthesis (x,y) shows the original position of the pixel in reference 2D data 70.

Figure 9:
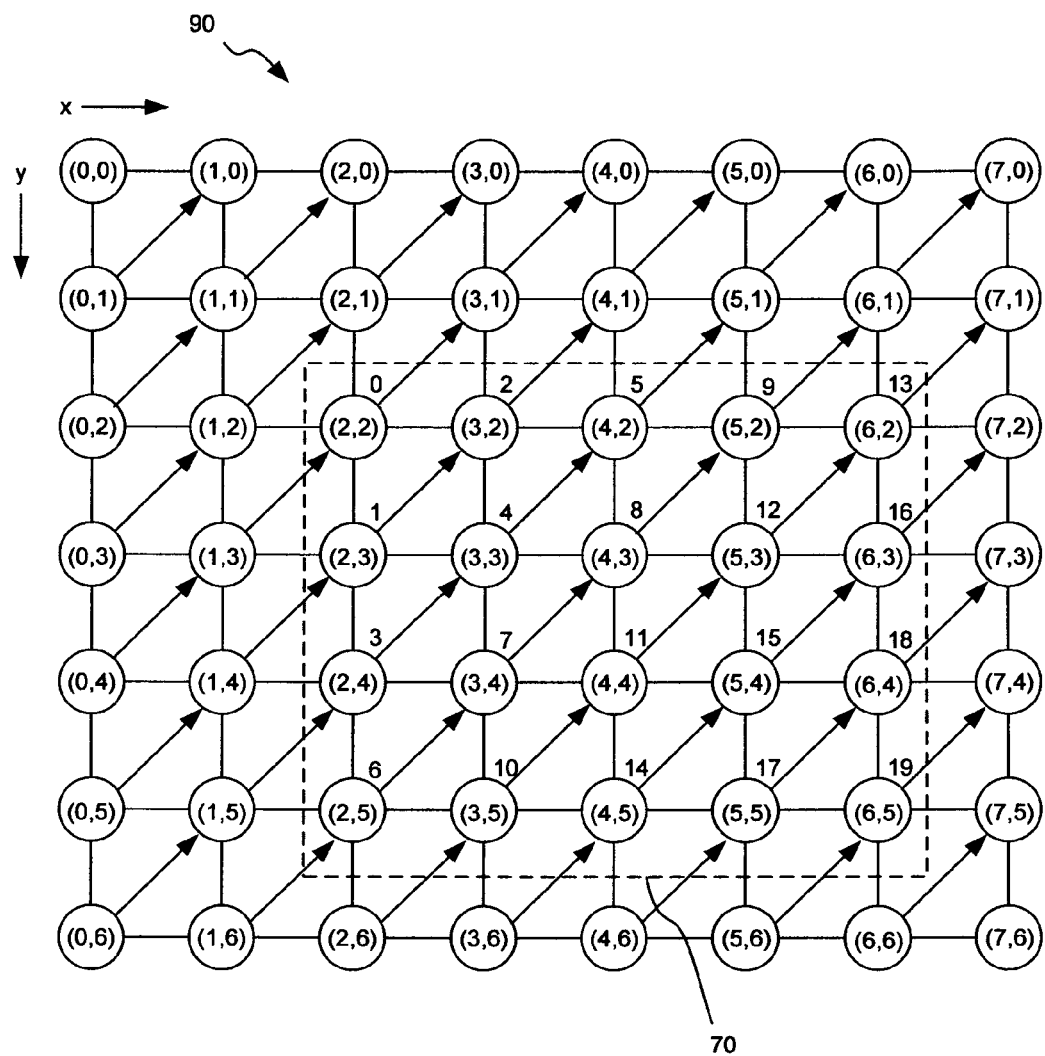
FIG. 9 is an input 2D data including a reference 2D data.
Figure 10:
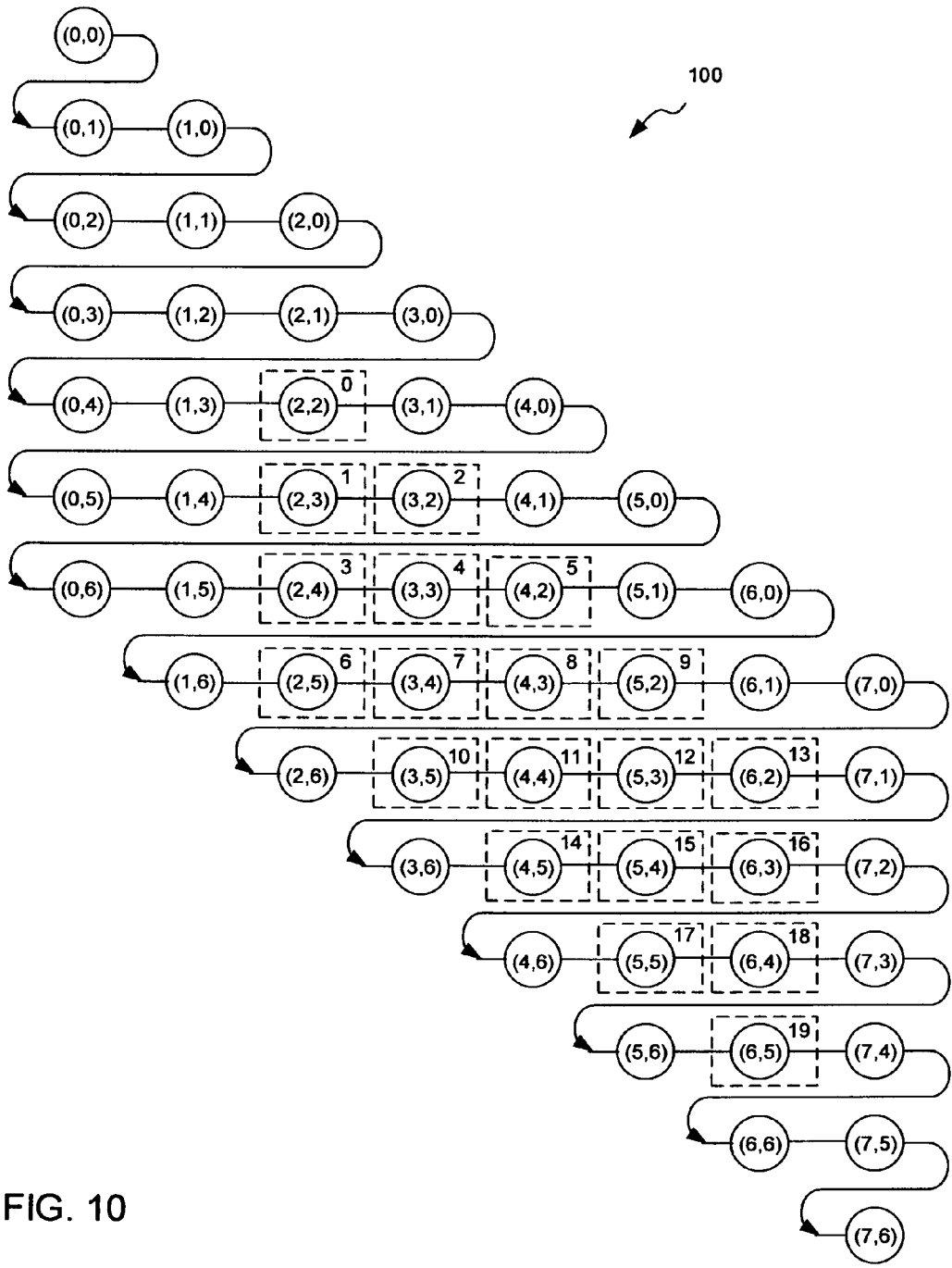
FIG. 10 is an input 1D data transformed from input 2D data of FIG. 9.

FIG. 9 shows an input 2D data 90, which may be an image, having 2D size of (M×N), (M×N) is the same or larger than (m×n) of reference 2D data 70 of FIG. 7, according to the present invention. Input 2D data 90 is transformed into an input 1D data 100 having 1D size or length of (L=M×N), (L=M×N) is the same or larger than (l=m×n) of reference 1D data 80 of FIG. 8, as shown in FIG. 10, according to the present invention. For example, input 2D data 90, which may be an image, includes reference 2D data 70, which may be a sub-image, as shown in FIG. 9, according to the present invention. The pixel number of each pixel of reference 2D data 70 is indicated at the right upper corner of the pixel. The original position (x,y) in input 2D data 90 is indicated in the circle representing a pixel.

The transformed input 1D data 100 is shown in FIG. 10, according to the present invention. Input 2D data is transformed following the same rules as the transformation of reference 2D data 70 to reference 1D data 80. The order of selected pixels in the transformed input 1D data follows the diagonal direction of the pixel position in input 2D data. The diagonal direction may be from left lower corner to right upper corner as described previously and shown in FIG. 7, according to the present invention. For example, (1) starting from (x=0,y=0); (2) moving one pixel down to (x=0,y=1); (3) moving diagonally one pixel up and one pixel right to (x=1,y=0); (4) moving back to (x=0,y=2), one pixel down from (x=0,y=1); and so forth. The original position (x,y) in input 2D data 90 is indicated in the circle representing a pixel.

Mathematically, similar rules may be expressed as follow.

Steps 1-$N$: $0 \leq i \leq (N-1)$, select $x=0$ and $y=i-x$; $x=1$ and $y=i-x$; $x=2$ and $y=i-x$; ... ; until $y=0$; $i$: integer. Rule (3)

Steps $(N+1)$-$(N+M-1)$: $1 \leq j \leq (M-1)$, select $x=j$ and $y=M-x+j-2$; $x=j+1$ and $y=M-x+j-2$; $x=j+2$ and $y=M-x+j-2$; ... until $x=M-1$; $j$: integer. Rule (4)

For input 2D data having 2D size of (M,N).

It is appreciated that the order of selected pixels in the transformed input 1D data follows the diagonal direction of the pixel position in input 2D data, while the diagonal direction is not limited to the direction from left lower corner to right upper corner as described previously. Other diagonal directions are possible.

Instead of matching sub-image or reference 2D data 20 with image or input 2D data 10 as shown in FIGS. 3-6, FIG. 10 shows that the pixels of the transformed input 1D data 100 is matched with the pixels of the transformed reference 1D data 80. The matched pixel is indicated by a dotted square. It is important to note that the order of pixels 0-19 in the transformed input 1D data 100 is the same as that of the transformed reference 1D data 80, although there may be some pixels in between pixel 0 and pixel 1; pixel 2 and pixel 3; pixel 5 and pixel 6; pixel 9 and pixel 10; pixel 13 and pixel 14; pixel 16 and pixel 17; and pixel 18 and pixel 19. In other words, pixel 0 is prior to pixel 1, pixel 1 is prior to pixel 2, pixel 2 is prior to pixel 3, and so forth, without referring pixels in between them.

Figure 11:
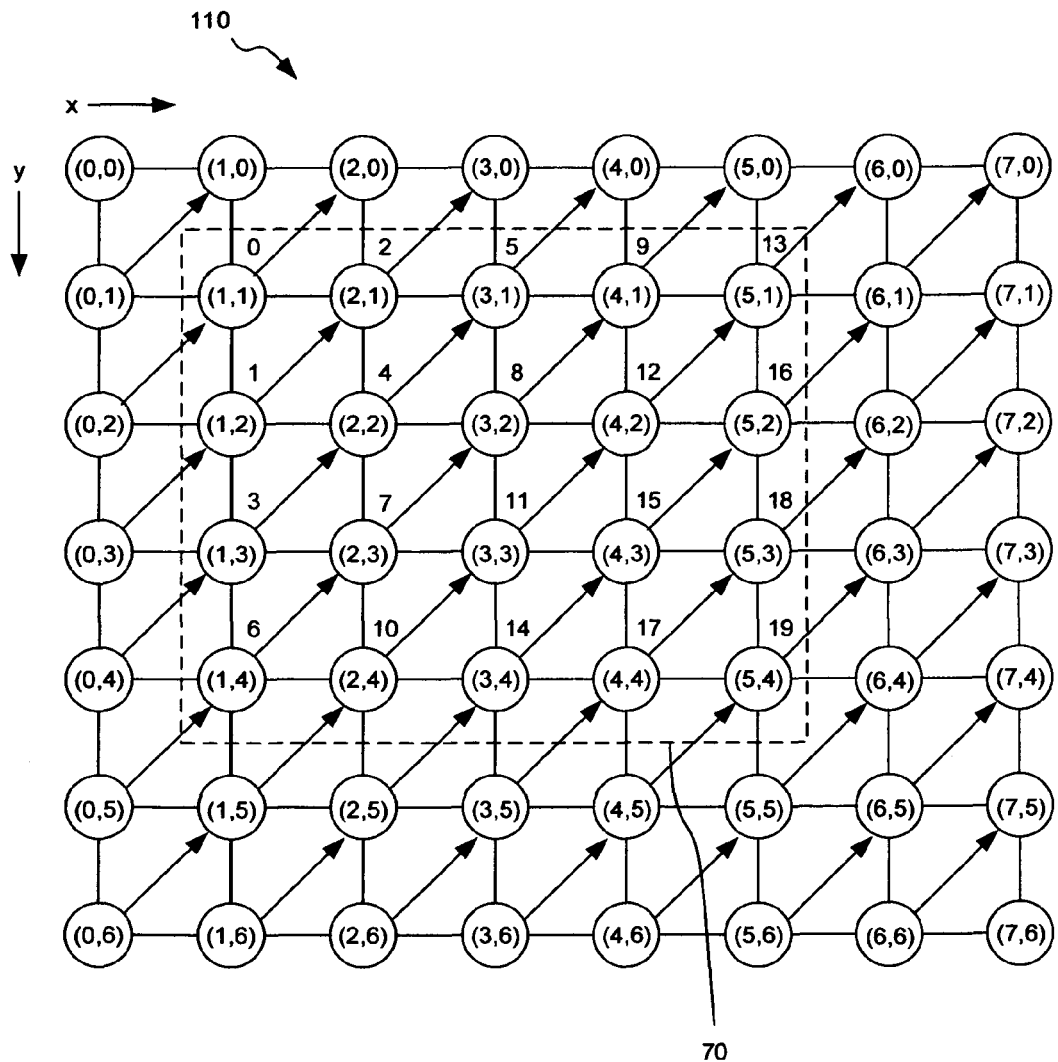
FIG. 11 is an input 2D data including a reference 2D data.
Figure 12:
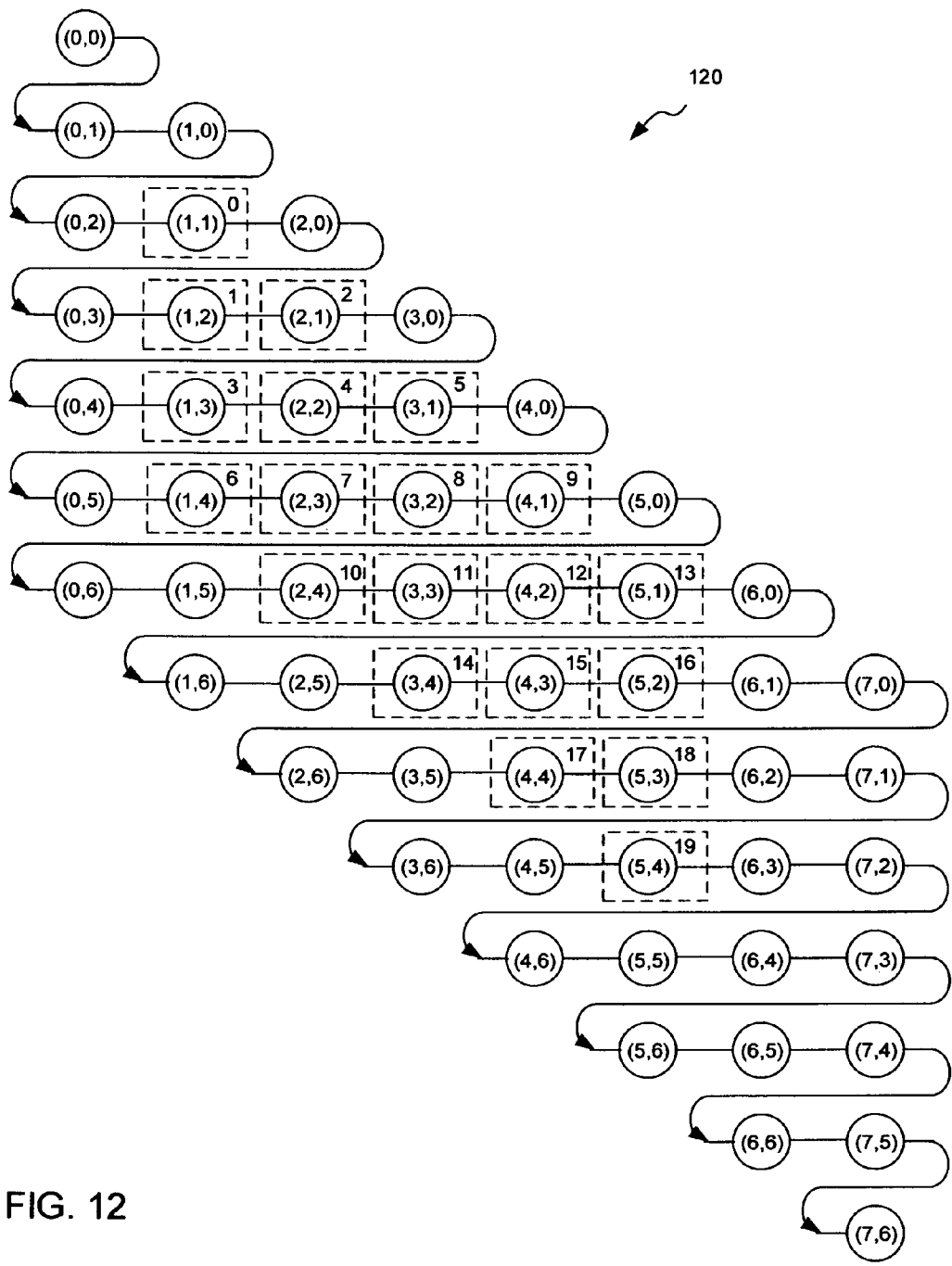
FIG. 12 is an input 1D data transformed from input 2D data of FIG. 11.

Another example is shown in FIGS. 11 and 12, according to the present invention. Sub-image or reference 2D data 70 is moved to another position in an input 2D data 110, which is different from the position in image or input 2D data 90 of FIG. 9, as shown in FIG. 11, according to the present invention. The transformed input 1D data 120 is shown in FIG. 12, which includes all pixels 0-19, according to the present invention. The positions of pixels 0-19 and the separations between pixel 0 and pixel 1; pixel 2 and pixel 3; pixel 5 and pixel 6; pixel 9 and pixel 10; pixel 13 and pixel 14; pixel 16 and pixel 17; and pixel 18 and pixel 19 are different from those of the transformed input 1D data 100 of FIG. 10. However, the order of relative position of pixels 0-19 in the transformed input 1D data 120 is the same as that of the transformed reference 1D data 80. In other words, pixel 0 is prior to pixel 1, pixel 1 is prior to pixel 2, pixel 2 is prior to pixel 3, and so forth, without referring pixels in between them. FIG. 12 shows that the pixels of the transformed input 1D data 120 is matched with the pixels of the transformed reference 1D data 80. The matched pixel is indicated by a dotted square.

Figure 13:
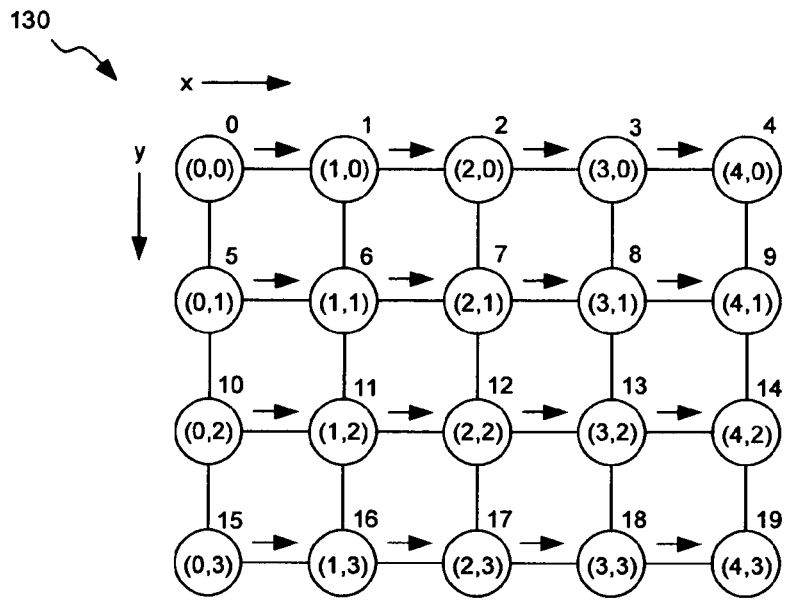
FIG. 13 is a reference 2D data.
Figure 14:
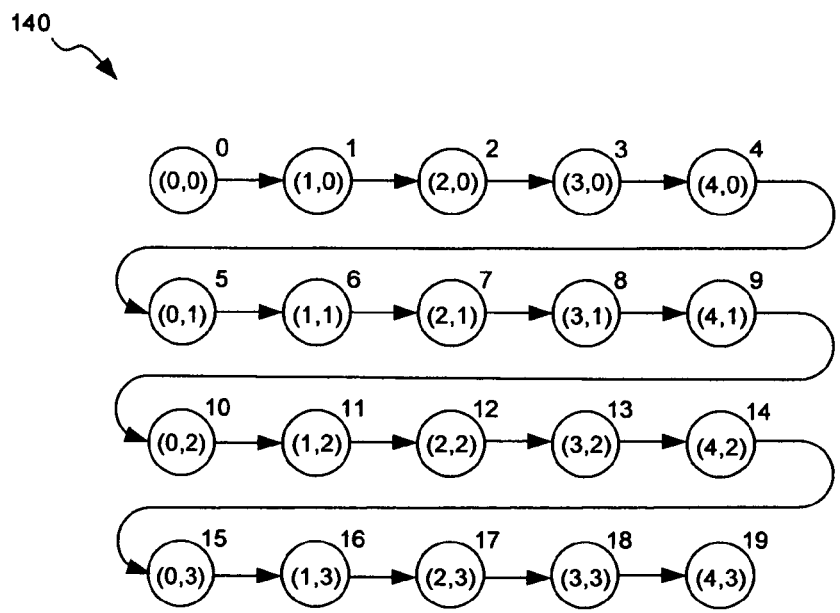
FIG. 14 is a reference 1D data transformed from reference 2D data of FIG. 13.

Another embodiment is described in the following. FIG. 13 shows a reference 2D data 130 or sub-image having 2D size of (m×n), according to the present invention. Reference 2D data 130 is transformed into a reference 1D data 140 having 1D size or length of (1=m×n) as shown in FIG. 14, according to the present invention. An original position (x,y) in 2D data 130 is indicated in the circle representing a pixel. Reference 2D data 130 is transformed into reference 1D data 140 by selecting pixels in a transformed 1D order. The transformed 1D order may be selecting pixels on the same raw from left to right. In other words, the selection of pixels follows: (1) starting from (x=-0,y=0), (x=1,y=0), . . . until (x=m-1,y=0); (2) repeating the same process by starting from (x=0,y=1), (x=1,y=1), . . . until (x=m-1,y=1); (3) repeating the same process until y=n-1; as shown in FIG. 13, according to the present invention.

Mathematically, the rule may be expressed as follows.

Steps 1-n: $0 \leq i \leq (n-1)$, select $x=0$ and $y=i$; $x=1$ and $y=i$; $x=2$ and $y=i$; . . . ; until $x=m-1$ and $y=I$;
$i$: integer.     Rule (5)

For reference 2D data having 2D size of (m,n).

For example, the transformed reference 1D data 140 includes: step 1: pixel 0, which is (0,0); pixel 1, which is (1,0); pixel 2, which is (2,0); pixel 3, which is (3,0); pixel 4, which is (4,0); step 2: pixel 5, which is (0,1); pixel 6, which is (1,1); pixel 7, which is (2,1); pixel 8, which is (3,1); pixel 9, which is (4,1); step 3: pixel 10, which is (0,2); pixel 11, which is (1,2); pixel 12, which is (2,2); pixel 13, which is (3,2); pixel 14, which is (4,2); step 4: pixel 15, which is (0,3); pixel 16, which is (1,3); pixel 17, which is (2,3); pixel 18, which is (3,3); and pixel 19, which is (4,3). The pixel number is indicated at the right upper corner of each pixel as shown in FIGS. 13 and 14, according to the present invention. The parenthesis (x,y) shows the original position of the pixel in reference 2D data 130.

Figure 15:
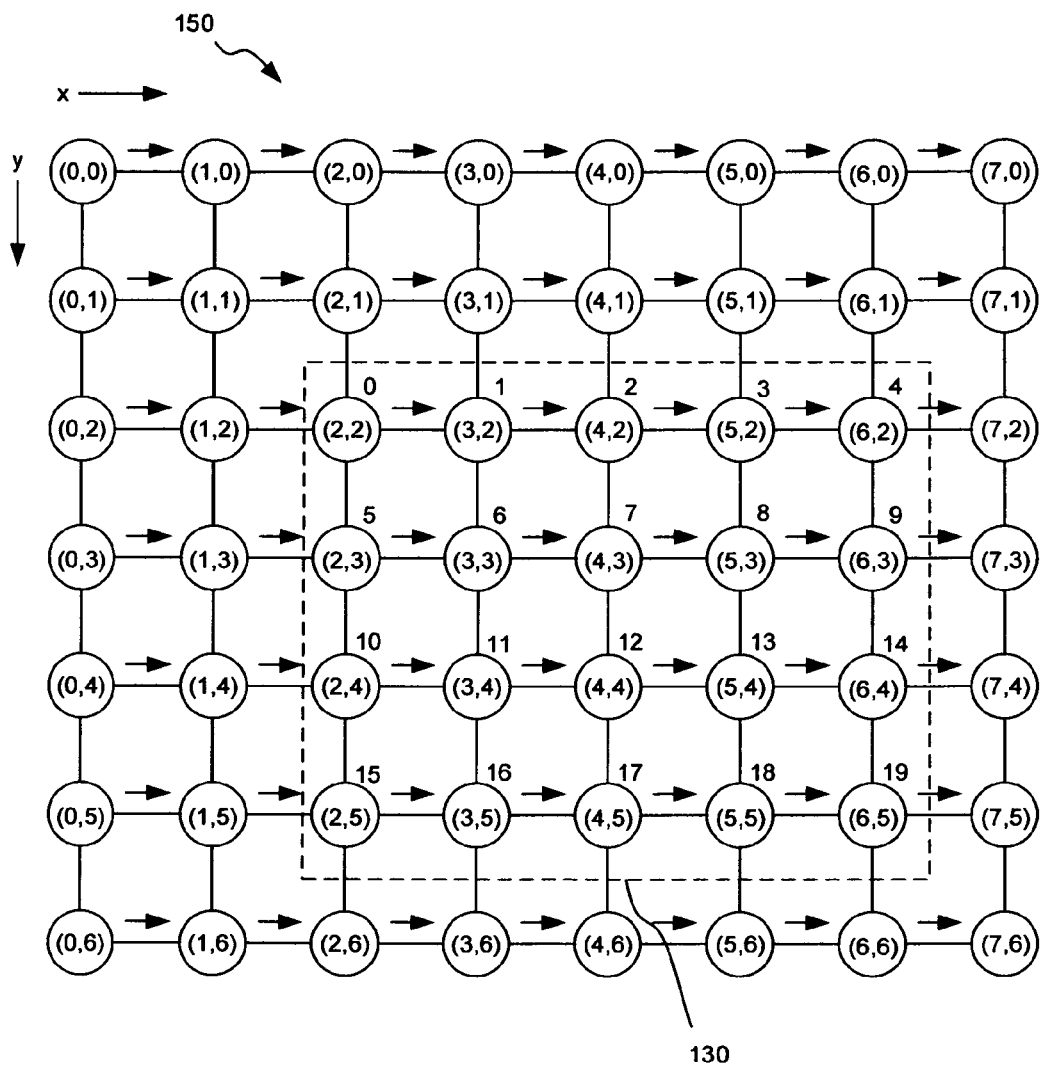
FIG. 15 is an input 2D data including a reference 2D data.

FIG. 15 shows an input 2D data 150 or image having 2D size of (M×N), which is transformed into an input 1D data 160 having 1D size or length of (L=M×N), according to the present invention. For example, input 2D data 150, which may be an image, includes reference 2D data 130, which may be a sub-image, as shown in FIG. 15, according to the present invention. The pixel number of each pixel of sub-image 130 is indicated at the right upper corner of the pixel. The original position (x,y) in input 2D data 150 is indicated in the circle representing a pixel.

Figure 16:
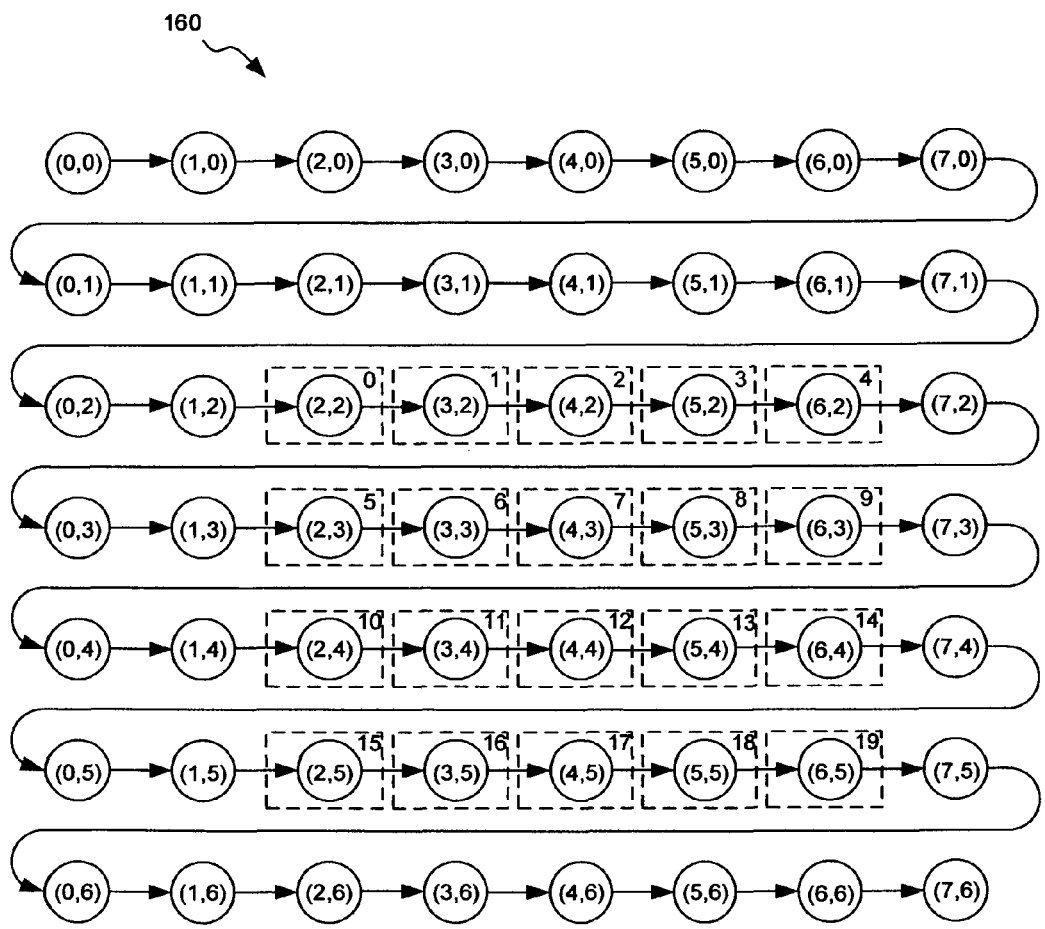
FIG. 16 is an input 1D data transformed from input 2D data of FIG. 15.

The transformed input 1D data 160 is shown in FIG. 16, according to the present invention. Input 2D data 150 is transformed following the same rule as the transformation of reference 2D data 130 to reference 1D data 140.

Mathematically, the rule may be expressed as follows.

Steps 1-N: $0 \leq i \leq (N-1)$, select $x=0$ and $y=i$; $x=1$ and $y=i$; $x=2$ and $y=i$; . . . ; until $x=M-1$ and $y=I$;
$i$: integer.     Rule (6)

For input 2D data having 2D size of (M,N).

The order of selected pixels in the transformed input 1D data follows the horizontal direction (i.e., x-direction) of the pixel position in input 2D data. The order may be first from left upper corner to right upper corner. Finally, the order may be from left lower corner to right lower corner, as described previously and shown in FIG. 15, according to the present invention. The original position (x,y) in 2D data 150 is indicated in the circle representing a pixel.

It is appreciated that the order of selected pixels in the transformed input 1D data may follow the vertical direction as well as the horizontal direction. Also, the direction may be from left to right, from right to left, and from top to bottom, or from bottom to top. All directions are possible.

FIG. 16 shows that the pixels of the transformed input 1D data 160 is matched with the pixels of the transformed reference 1D data 140. The matched pixel is indicated by a dotted square. It is important to note that the order of pixels 0-19 in the transformed input 1D data 160 is the same as that of the transformed reference 1D data 140, although there may be some pixels in between pixel 4 and pixel 5; pixel 9 and pixel 10; and pixel 14 and pixel 15. In other words, pixel 0 is prior to pixel 1, pixel 1 is prior to pixel 2, pixel 2 is prior to pixel 3, and so forth, without referring pixels in between them.

It is further appreciated that other transformation rules are possible to select the pixel in a specific order. However, the rules for the input data and the reference data must be the same.

1D Data Feature Matching

Figure 17:
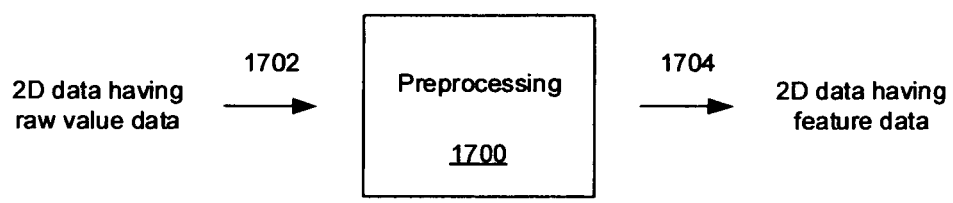
FIG. 17 illustrates preprocessing to provide 2D feature data from 2D raw value data.

Referring back to FIG. 7, each pixel in reference 2D data 70 or the sub-image is represented by its raw value or values, for example, which may be brightness, R, G, and B values, or other attributes that can be defined for each pixel. In an embodiment, each pixel in reference 2D data 70 or the sub-image is represented by its feature. The feature is determined in a preprocessing 1700 as shown in FIG. 17, according to the present invention. A 2D data having raw value data 1702 is processed in preprocessing 1700 to provide a 2D feature data 1704. The 2D data may be a reference 2D data or an input 2D data.

Figure 18:
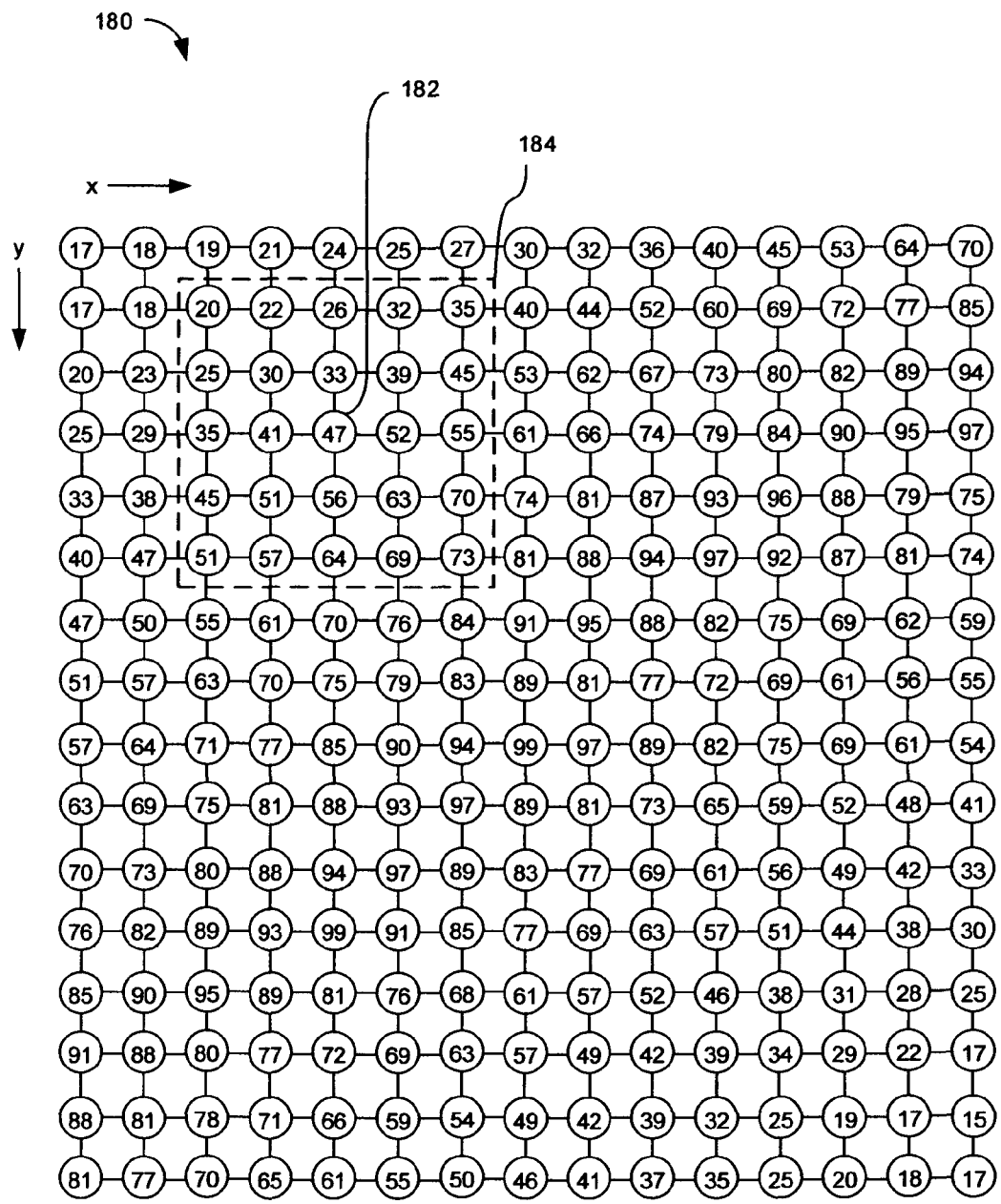
FIG. 18 illustrates a 2D data having a feature at a pixel.

For example, a 2D data 180 having a feature at a pixel 182 is illustrated in FIG. 18, according to the present invention. The 2D data may be a reference 2D data or an input 2D data. The feature of pixel 182 is determined from raw value data of pixels in a region 184 centered or marked by pixel 182. For example, the raw value data of pixels is indicated in the circles representing pixels. The feature may indicate edge, corner, a specific texture, a specific geometry, or a specific color histogram in a region centered or marked by the pixel. The size of region 184 may be large or may be small, depending on the application and an algorithm of preprocessing 1700. Pixel 182 may not be at a center position of region 184. Pixel 182 may be inside or outside region 184.

The reference 2D data and the input 2D data are processed by the same preprocessing 1700 to provide similar features.

In an embodiment comprising preprocessing 1700 shown in FIG. 17, a reference 2D feature data 70 having 2D size of (m×n) of FIG. 7 is transformed into a reference 2D feature data 80 of FIG. 8. Reference 1D feature data 80 comprises a plurality of pixels 0-19. Each pixel is individually represented by its feature. Each pixel is no longer represented by raw value data. The feature is determined from a region centered or marked by the pixel in preprocessing 1700.

Referring back to FIG. 9, input 2D data 90 or image has 2D size of (M×N), (M×N) is the same or larger than (m×n) of reference 2D data 70 of FIG. 7. In an embodiment comprising preprocessing 1700 shown in FIG. 17, an input 2D feature data 90 of FIG. 9 is transformed into an input 2D feature data 100 of FIG. 10.

Similarly, before input 2D feature data 90 is transformed into input 1D feature data 100 of FIG. 10, input 2D data 90 having raw value data is processed in the same preprocessing 1700 to provide input 2D feature data 90. The transformed input 1D feature data 100 is shown in FIG. 10. The transformed 1D input feature data 100 is matched with the individual pixels 0-19 of the transformed reference 1D feature data 80, where each pixel may have its unique feature.

Since the transformation of reference 2D feature data 70 and input 2D feature data 90 are based on the same specific order, which are expressed by Rules (1) and (2) and Rules (3) and (4), the matches of the transformed input 1D feature data 100 with the transformed reference 1D feature data 80 will follow the same order as pixel 0-19, as shown in FIG. 10, according to the present invention. For example, it is impossible to find a match of pixel 5 first, and later a match of pixel 3. It should be the match with pixel 3 first and later the match with pixel 5.

Figure 19:
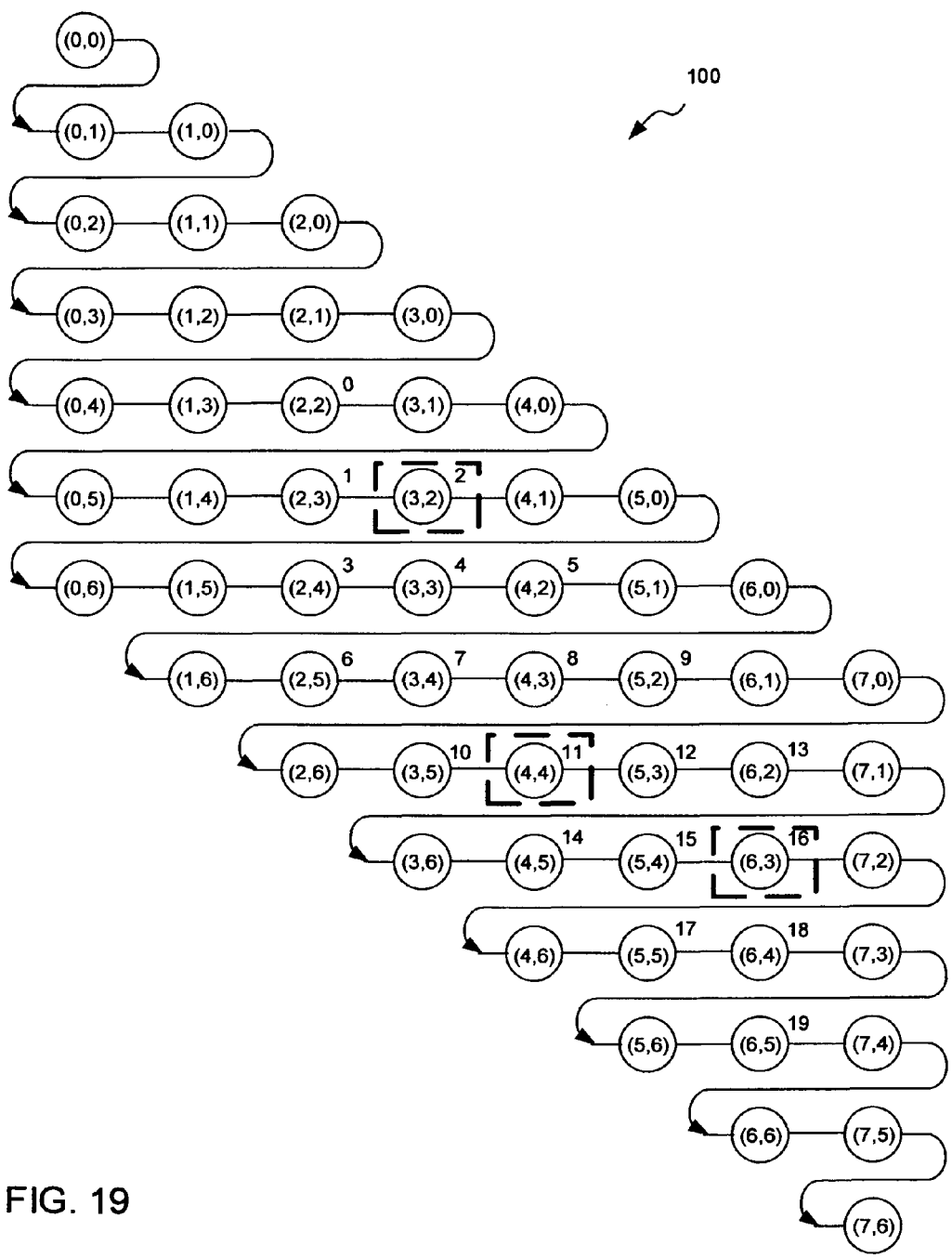
FIG. 19 illustrates a transformed input 1D data having three matches with the transformed reference 1D data.

FIG. 19 shows an example that the transformed input 1D feature data 100 has three matches with pixel 2, pixel 11, and pixel 16 of the transformed reference 1D feature data 80, according to the present invention. The matched pixel is indicated by a dotted square. It is appreciated that the expression of "match with pixel 2 of the transformed reference 1D feature data 80" is the same as the expression of "match with the feature at pixel 2 of the transformed 1D reference feature data 80".

Figure 20:
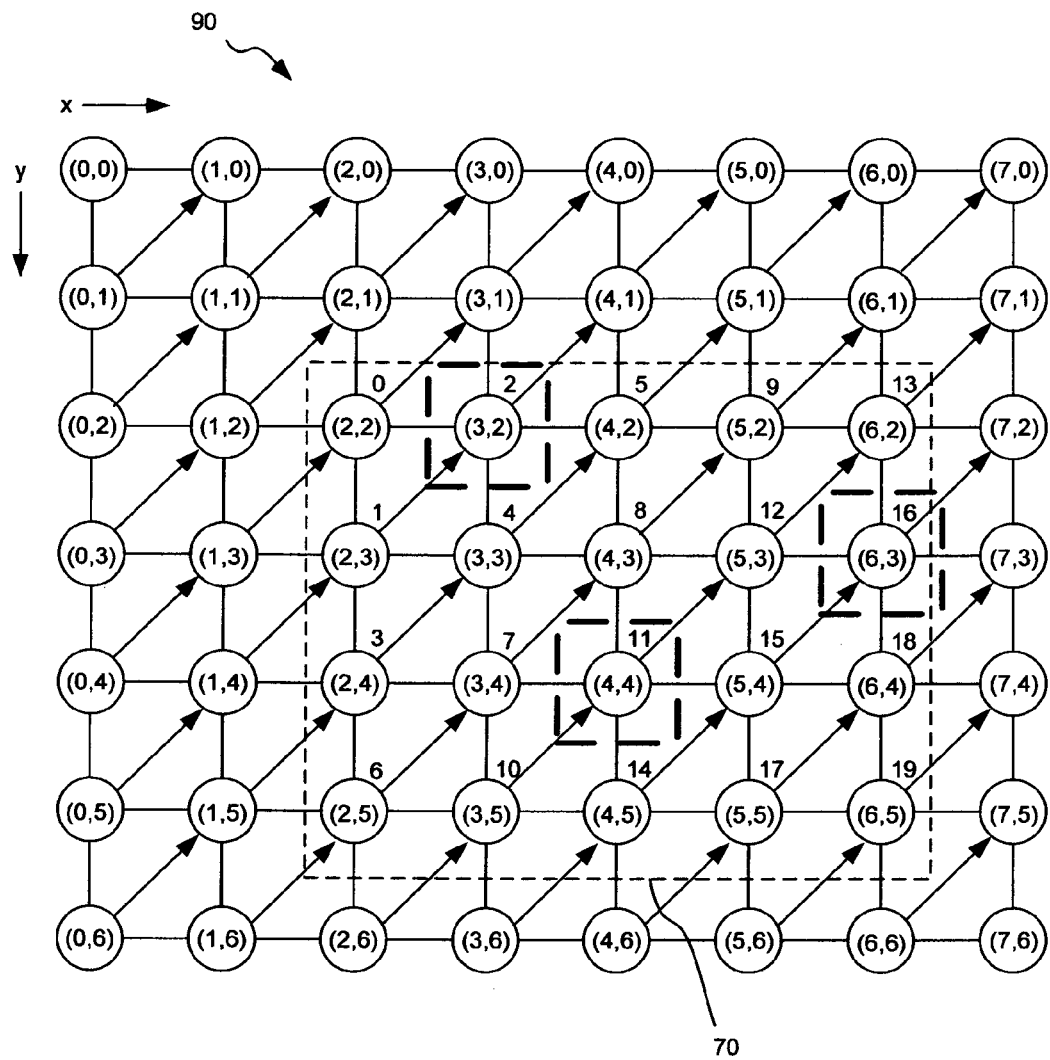
FIG. 20 illustrates the verification of the three matches of FIG. 19.

FIG. 20 shows that the matched pixel 2, pixel 11, and pixel 16 are put back in input 2D data 90, according to the present invention. As shown in FIG. 20, pixel 2 is at the position (3,2), pixel 11 is at the position (4,4), and pixel 16 is at the position (6,3) in input 2D data 90. Accordingly, it is verified that the matched pixel 2, pixel 11, and pixel 16 belong to a reference 2D data 70. The location of reference 2D data 70 or the sub-image in input 2D data 90 or the image can also be determined.

It is appreciated that the verification may also be carried out by calculating: the distance from the second matched pixel, e.g., pixel 11, to the first matched pixel, e.g., pixel 2; the distance from the third matched pixel, e.g., pixel 16, to the first matched pixel, e.g., pixel 2; and so forth, if more matched pixels are found. Referring to the first matched pixel position, e.g., pixel 2, the location of reference 2D data 70 or the sub-image in input 2D data 90 or the image can be determined.

Figure 21:
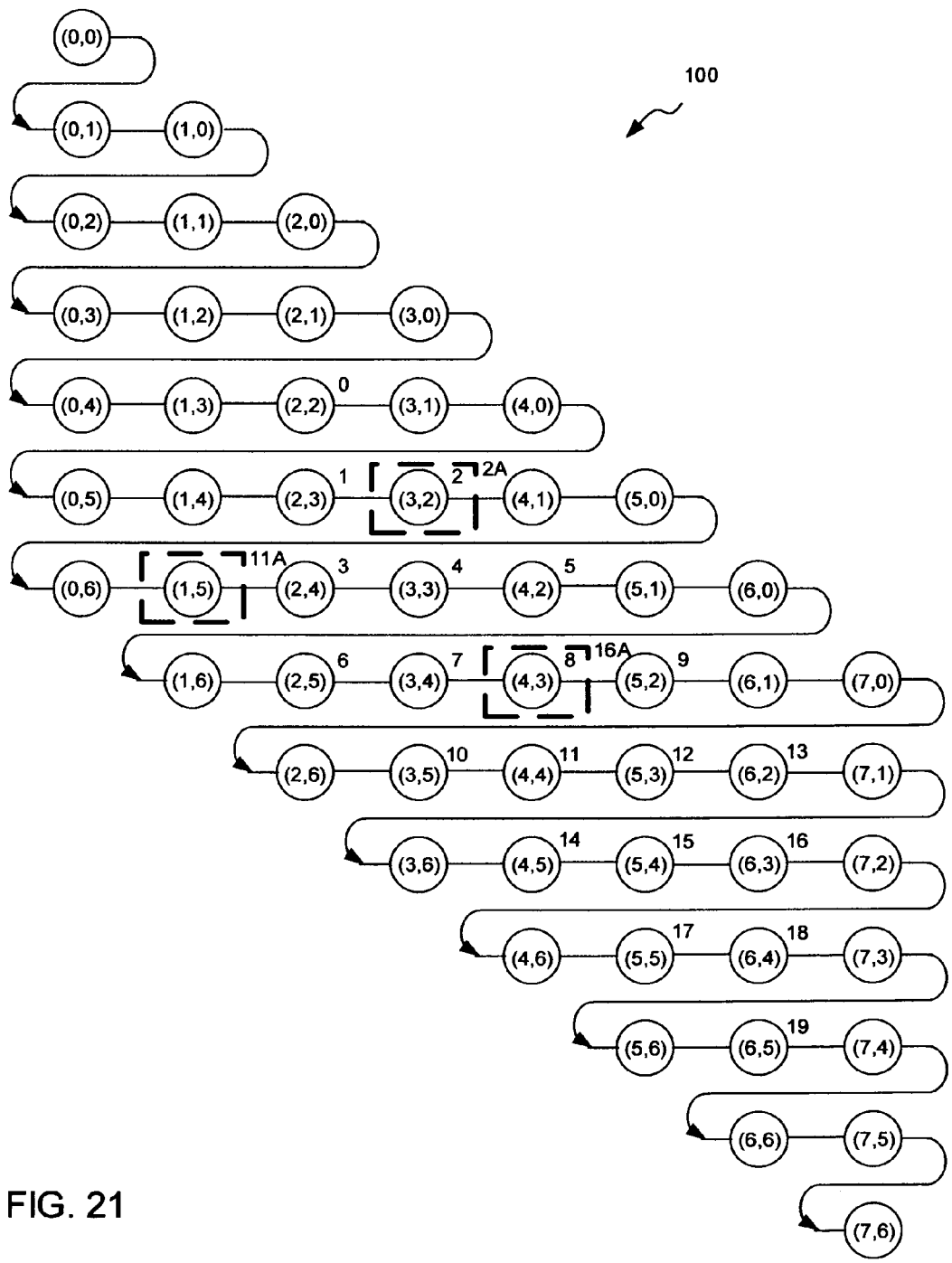
FIG. 21 illustrates a transformed input 1D data having three matches with the transformed reference 1D data.

FIG. 21 shows an example that the transformed 1D input feature data 100 has three matches with pixel 2 at the position of pixel 2A, pixel 11 at the position of pixel 11A, and pixel 16 at the position of pixel 16A of the transformed reference 1D feature data 80, according to the present invention. The matched pixel is indicated by a dotted square.

Figure 22:
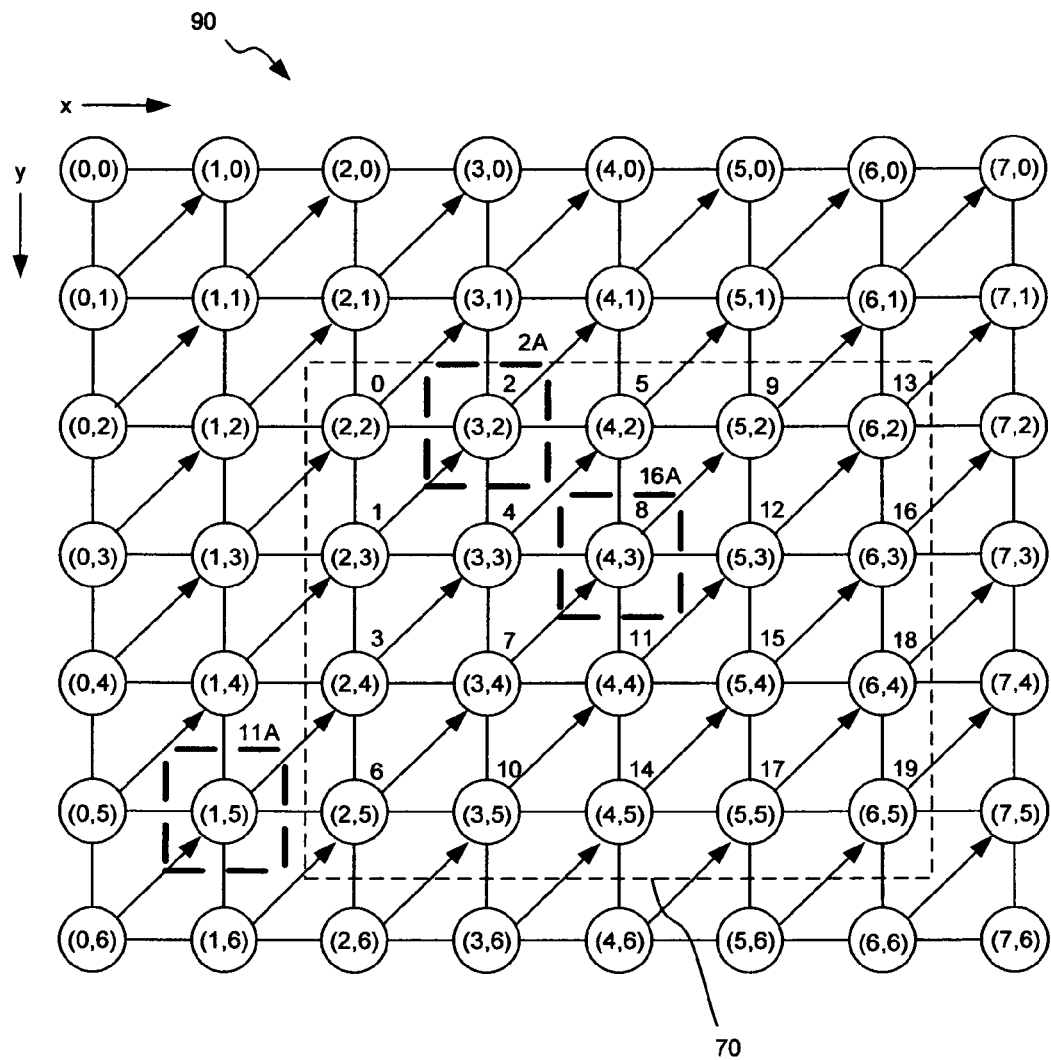
FIG. 22 illustrates the verification of the three matches of FIG. 21.

In the verification process, for example, reference 2D data 70 cannot be matched since pixel 11 is at the wrong location of pixel 11A, and pixel 16 is at the wrong location of pixel 16A, which is the location of pixel 8, although pixel 2 is at the right position as shown in FIG. 22, according to the present invention.

Needless to say, in an embodiment, the transformation of the reference 2D feature data to the reference 1D feature data, and the transformation of the input 2D feature data to the input 1D feature data may follow aforementioned Rule (5) and Rule (6), respectively, as well. In this manner, feature matching for 1D feature data may be performed as described previously. It is appreciated that other transformation rules are possible to select the pixel in a specific order. However, the rules for the input data and reference data must be the same.

In feature matching for 1D data, a plurality of pixel matches or feature matches may be sufficient to determine the matched reference 2D data or sub-image. It is not necessary to find complete or full matches of all pixels of the reference 2D data or sub-image to determine that a reference 2D data or sub-image is matched. Thus, it will save the searching time of a reference 2D data or sub-image.

1D Searching Procedure

As mentioned previously, in feature matching for 1D data, a plurality of feature matches may be sufficient to determine the matched reference 2D data or sub-image. It is not necessary to find complete or full matches of all pixels of the reference 2D data or sub-image to determine that a reference 2D data or sub-image is matched. Thus, it will save the searching time of a reference 2D data or sub-image. Accordingly, it is appreciated that the reference 2D data may not have features at every pixel positions.

For a reference data or sub-image comprising a large number of pixels, it may not be necessary to assign each pixel with a feature. To understand the 1D searching procedure, assume that a reference 2D data having two features F0 and F1. It is appreciated that the reference 2D data may have more than two features.

For example, one hundred input 2D data I2D000-I2D099 (images) are provided. Each input 2D data has a plurality of pixels. Preprocessing 170 is performed for each input 2D data to determine the features of each pixel of each input 2D data. The preprocessing is the same as the preprocessing for determining features of the reference 2D data. Some pixels of the reference 2D feature data may not have any features. In an embodiment, the preprocessing 170 comprises a program or subroutine for determining features of a 2D data. All input 2D feature data are transformed into input 1D feature data, accordingly there are one hundred input 1D feature data I1D000-I1D099. One or more input 1D feature data from I1D000-I1D099 may include features F0 and F1. For example, positions of features F0 and F1 in input 1D feature data is illustrated in Table 1.

Table 1 illustrates the features F0 and F1 and their exemplary positions in input 1D feature data I1D000-I1D099.

TABLE 1

| Feature | Input 1D data | Pixel positions |
|---------|---------------|-----------------|
| F0      | ...           |                 |
|         | I1D010        | P1; P10         |
|         | ...           |                 |
|         | I1D015        | P5              |
|         | ...           |                 |

TABLE 1-continued

| Feature | Input 1D data | Pixel positions |
|---|---|---|
|  | I1D023 | P25; P36 |
|  | ... |  |
|  | I1D055 | P30 |
|  | ... |  |
|  | I1D076 | P23 |
|  | ... |  |
|  | I1D090 | P6 |
|  | ... |  |
| F1 | I1D099 | P18 |
|  | ... |  |
|  | I1D018 | P7 |
|  | ... |  |
|  | I1D022 | P10; P15 |
|  | I1D023 | P45 |
|  | ... |  |
|  | I1D054 | P17 |
|  | ... |  |

The search is conducted from the smallest number input 1 D feature data (I1D000) to the largest number input 1D feature data (I1D099). One may not search a smaller number 1D feature data (e.g., I1D050) after a larger number input 1D feature data (e.g., I1D051). Referring to Table 1, the search of reference 1D feature data in all input 1D feature data I1D000-I1D099 may be conducted as follows.

(1) Search feature F0 starting from I1D000. F0 is found in I1D010 at P1.
(2) Since there is no F0 in I1D000-I1D009, and F0 and F1 must be in the same input data, skip I1D000-I1D009. Search feature F1 starting from I1D010. F1 is found in I1D018 at P7.
(3) Since there is no F0 in I1D000-I1D009, there is no F1 in I1D010-I1D017, and F0 and F1 must be in the same input data, skip I1D000-I1D017. Search feature F0 starting from I1D018. F0 is found in I1D023 at P25.
(4) Since there is no F0 in I1D000-I1D009, there is no F1 in I1D010-I1D017, there is no F0 in I1D018-I1D022, and F0 and F1 must be in the same input data, skip I1D000-I1D022. Search feature F1 starting from 11D023. F1 is found in the same I1D023 at P45.
(5) The location of F0 and F1 in input 2D data I2D023 are determined. If the location of F0 and F1 are matched the locations of corresponding features in the reference 2D data, input 2D data I2D023 matches the reference 2D data.
(6) Since there is no match in I1D000-I1D022, and there is a match in I1D023, the same process is repeated starting from 12D024 until the last input 1D data I1D099 is searched.

In this way, the search of a reference data comprising features F0 and F1 in a plurality of input data can be conducted quickly. Accordingly, if the size of the reference 2D data or sub-image is (m×n), and the size of an input 2D data or image is (M×N), to match hundreds or thousands of input 2D data, it may take much less than hundreds or thousands (M×N)×(m×n) steps of computations.

Searching 3D and nD Input Data

Figure 23:
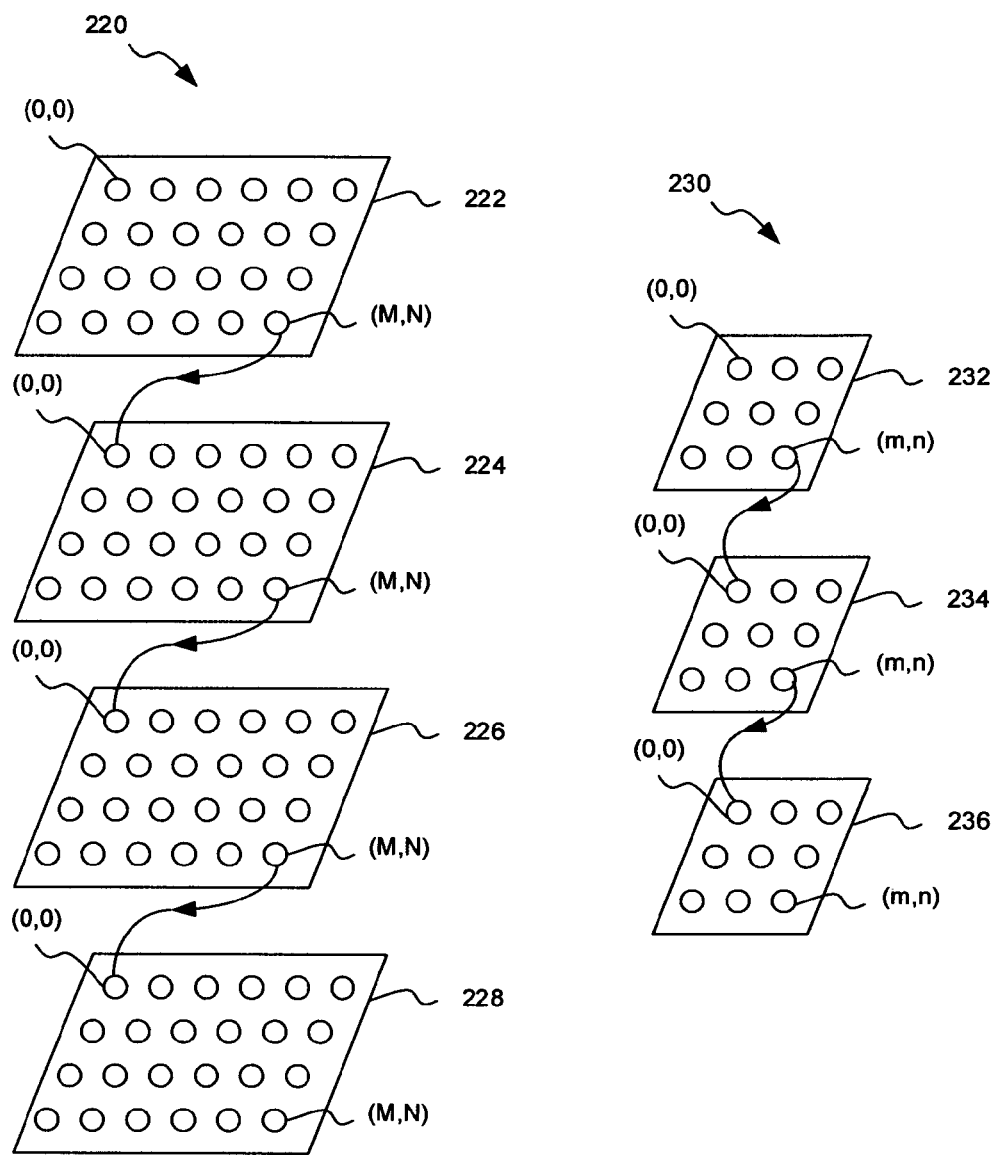
FIG. 23 illustrates a 3D data is transformed into a 1D data.

An embodiment for searching input 3D data based on the same transformed reference 1D data is illustrated in FIG. 23, according to the present invention. An input 3D data 220 may comprise a first layer 222, a second layer 224, a third layer 226, and a fourth layer 228. Each layer has an input 2D data comprising pixels (0,0) to (M,N), which can be transformed into an input 1D data as described previously. The first pixel (0,0) of the second layer 224 is connected to and follows the last pixel (M,N) of the first layer 222. The first pixel (0,0) of the third layer 226 is connected to and follows the last pixel (M,N) of the second layer 224. The first pixel (0,0) of the fourth layer 228 is connected to and follows the last pixel (M,N) of the third layer 226. In this manner, the input 3D data 220 is transformed into an input 1D data.

Similarly, a reference 3D data 230 may be transformed into a reference 1D data as illustrated in FIG. 23, according to the present invention. Reference 3D data 230 may comprise a first layer 232, a second layer 234, and a third layer 236. Each layer has a reference 2D data comprising pixels (0,0) to (m,n), which can be transformed into a reference 1D data as described previously. The first pixel (0,0) of the second layer 234 is connected to and follows the last pixel (m,n) of the first layer 232. The first pixel (0,0) of the third layer 226 is connected to and follows the last pixel (m,n) of the second layer 224. In this manner, the reference 3D data 230 is transformed into a reference 1D data. The transformed input 1D data is matched with the transformed reference 1D data, as described previously.

In a searching process, a reference 3D data is provided. The reference 3D data is transformed into a reference 1D data. A plurality of input 3D data is also provided. Each input 3D data is transformed into an input 1D data. A transformed input 1D data is searched from the plurality of input 1D data that matches with the transformed reference 1D data.

An n-dimensional (nD) data may be decomposed into a plurality of (n−1)D data, each (n−1)D data is then decomposed into a plurality of (n−2)D data, and so forth until a plurality of 2D data. Each 2D data may be transformed into a 1D data. The nD data may be transformed into 1D data similar to the transformation of 3D data into 1D data, as described previously. The same transformed 1D data matching may be applied.

In a computer method, a reference 2D data having a first 2D size is provided. The reference 2D data comprises a first plurality of pixels defined in 2D coordinates. The reference 2D data is transformed into a reference 1D data having a first 1D size. The reference 1D data comprises the first plurality of pixels in a transformed 1D order. The transforming is performed by selecting pixels of the first plurality of pixels in the transformed 1D order. A plurality of input 2D data are also provided. An input 2D data having a second 2D size comprises a second plurality of pixels defined in 2D coordinates. The second 2D size is the same as or larger than the first 2D size. The plurality of input 2D data are transformed into a plurality of input 1D data, which comprises transforming the input 2D data into an input 1D data having a second 1D size. The second 1D size is the same as or larger than the first 1D size. Transforming the input 2D data into the input 1D data is the same as transforming the reference 2D data into the reference 1D data. Finally, a transformed input 1D data from the plurality of input 1D data that matches the transformed reference 1D data is searched.

In a computer method, a reference 2D data having a first 2D size is provided. The reference 2D data comprises raw value data associated with a first plurality of pixels defined in 2D coordinates. The reference 2D data is preprocessed to provide a reference 2D feature data comprises feature data associated with the first plurality of pixels defined in 2D coordinates. A feature associated with a pixel is determined from raw value data of pixels in a region centered or marked by the pixel. The reference 2D feature data is transformed into a reference 1D feature data having a first 1D size. The transforming is performed by selecting pixels of the first plurality of pixels in a transformed 1D order. Only part of the reference 2D data comprising the first plurality of pixels may have features.

A plurality of input 2D data are also provided. An input 2D data having a second 2D size. The input 2D data comprises raw value data associated with a second plurality of pixels defined in 2D coordinates. The second 2D size is the same as or larger than the first 2D size. The plurality of input 2D data are preprocessed to provide a plurality of input 2D feature data. Preprocessing the plurality of input 2D data to provide the plurality of input 2D feature data is the same as preprocessing the reference 2D data to provide the reference 2D feature data. The plurality of input 2D feature data is transformed into a plurality of input 1D feature data, which comprises transforming an input 2D feature data into an input 1D feature data having a second 1D size. The second input 1D size is the same as or larger than the first 1D size. Transforming the input 2D feature data into the input 1D feature data is the same as transforming the reference 2D feature data into the reference 1D feature data. Finally, a transformed input 1D feature data from the plurality of input 1D feature data that matches with the transformed reference 1D feature data is searched. Only part of the input 2D data comprising the second plurality of pixels may have features.

The searching of a transformed input 1D feature data comprises following steps: (a) the reference 1D feature data comprises a first feature and a second feature; (b) the first feature is searched consecutively in the plurality of input 1D data starting from a first input 1D feature data of the plurality of input 1D feature data, until the first feature matches a feature of a pixel in a (1+p)-th input 1D feature data of the plurality of input 1D feature data, wherein p is a positive integer (p≥0); (c) the second feature is searched consecutively in the plurality of input 1D data starting from the (1+p)-th input 1D feature data, until the second feature matches a feature of a pixel of a (1+p+q)-th input 1D feature data of the plurality of input 1D feature data, wherein q is a positive integer (q≥0); (d) repeat step (b) and step (c) by searching consecutively the first feature in the plurality of input 1D data starting from the (1+p+q)-th input 1D feature data, until both the first and second features are matched features of two pixels of the same r-th input 1D feature data of the plurality of input 1D feature data, r is a non-zero positive integer (r≥1); (e) positions of the two pixels of the same r-th input 1D feature data are verified whether the positions match positions of the first and second features in the reference 2D feature data.

While the present invention has been described herein with respect to the exemplary embodiments and the best mode for practicing the invention, it will be apparent to one of ordinary skill in the art that many modifications, improvements and sub-combinations of the various embodiments, adaptations and variations can be made to the invention without departing from the spirit and scope thereof. For the disclosed methods, the steps need not necessarily be performed sequentially.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A computer method comprising:
   providing a reference 2D data having a first 2D size, wherein the reference 2D data comprises a first plurality of pixels defined in 2D coordinates;
   transforming the reference 2D data into a reference 1D data having a first 1D size, wherein the reference 1D data comprises the first plurality of pixels in a transformed 1D order, and wherein the transforming is performed by selecting pixels of the first plurality of pixels in the transformed 1D order;
   providing a plurality of input 2D data, wherein an input 2D data having a second 2D size comprises a second plurality of pixels defined in 2D coordinates, and wherein the second 2D size is same as or larger than the first 2D size;
   transforming the plurality of input 2D data into a plurality of input 1D data comprising transforming the input 2D data into an input 1D data having a second 1D size, wherein the second 1D size is same as or larger than the first 1D size, and wherein the transforming the input 2D data into the input 1D data is same as the transforming the reference 2D data into the reference 1D data; and
   searching for a transformed input 1D data from the plurality of input 1D data that matches the transformed reference 1D data;
   wherein the reference 2D data and the input 2D data comprise features associated with the first and second plurality of pixels defined in 2D coordinates, respectively;
   wherein the features associated with the first plurality of pixels defined in 2D coordinates represent the first plurality of pixels of the reference 1D data, and the features associated with the second plurality of pixels defined in 2D coordinates represent the second plurality of pixels of the input 1D data;
   wherein the searching comprises searching matches between features representing the second plurality of pixels of the input 1D data and features representing the first plurality of pixels of the reference 1D data; and
   wherein the searching comprises following steps:
   (a) the features representing the first plurality of pixels of the reference 1D data comprises a first feature and a second feature;
   (b) the first feature is searched consecutively in the plurality of input 1D data starting from a first input 1D data, until the first feature matches a feature of a pixel in a (1+p)-th input 1D data, wherein p is a positive integer (p≥0);
   (c) the second feature is searched consecutively in the plurality of input 1D data starting from the (1+p)-th input 1D data, until the second feature matches a feature of a pixel of a (1+p+q)-th input 1D data, wherein q is a positive integer (q≥0);
   (d) repeat step (b) and step (c) by searching consecutively the first feature in the plurality of input 1D data starting from the (1+p+q)-th input 1D data, until both the first and second features are matched features of two pixels of a same r-th input 1D data, r is a non-zero positive integer (r≥1);
   (e) positions of the two pixels of the same r-th input 1D data are verified whether the positions match positions of the first and second features in the reference 2D data.

2. The computer method of claim 1, wherein the transformed 1D order comprises selecting pixels along a diagonal direction.

3. The computer method of claim 2, wherein selecting pixels along a diagonal direction comprises following steps:

Steps 1-$n$: $0 \leq i \leq (n-1)$, select $x=0$ and $y=i-x$; $x=1$ and $y=i-x$; $x=2$ and $y=i-x$; . . . ; until $y=0$; $i$: integer; and Steps $(n+1)$-$(n+m-1)$: $1 \leq j \leq (m-1)$, select $x=j$ and $y=m-x+j-2$; $x=j+1$ and $y=m-x+j-2$; $x=j+2$ and $y=m-x+j-2$; . . . until $x=m-1$; $j$: integer;

wherein (m,n) is the first 2D size.

4. The computer method of claim 1, wherein the transformed 1D order comprises selecting pixels along a horizontal or vertical direction.

5. The computer method of claim 4, wherein selecting pixels along a horizontal direction comprises following steps:

Steps 1-$n$: $0 \leq i \leq (n-1)$, select $x=0$ and $y=i$; $x=1$ and $y=i$; $x=2$ and $y=i$; ...; until $x=m-1$ and $y=i$; $i$: integer;

wherein (m,n) is the first 2D size.

6. The computer method of claim 1, wherein a feature associated with a pixel is determined from raw value data of pixels in a region centered or marked by the pixel.

7. The computer method of claim 6, wherein the feature indicates one of edge, corner, texture, geometry, and color histogram in the region centered or marked by the pixel.

8. The computer method of claim 1, wherein only part of the first plurality of pixels defined in 2D coordinates has features.

9. The computer method of claim 1, wherein the reference 2D data comprises a 2D data of a plurality of 2D data decomposed from a 3D data.

10. The computer method of claim 9, wherein the reference 1D data comprises a plurality of reference 1D data transformed from the plurality of 2D data decomposed from the 3D data.

11. The computer method of claim 1, wherein the reference 2D data comprises a 2D data of a plurality of 2D data decomposed from an nD (n-dimensional) data, wherein n is a positive integer.

12. The computer method of claim 11, wherein the reference 1D data comprises a plurality of reference 1D data transformed from the plurality of 2D data decomposed from the nD data.

13. A computer method comprising:
providing a reference 2D data having a first 2D size, wherein the reference 2D data comprises raw value data associated with a first plurality of pixels defined in 2D coordinates;
preprocessing the reference 2D data to provide a reference 2D feature data comprises feature data associated with the first plurality of pixels defined in 2D coordinates, wherein a feature associated with a pixel is determined from raw value data of pixels in a region centered or marked by the pixel;
transforming the reference 2D feature data into a reference 1D feature data having a first 1D size, wherein the transforming is performed by selecting pixels of the first plurality of pixels in a transformed 1D order;
providing a plurality of input 2D data, wherein an input 2D data having a second 2D size, wherein the input 2D data comprises raw value data associated with a second plurality of pixels defined in 2D coordinates, and wherein the second 2D size is same as or larger than the first 2D size;
preprocessing the plurality of input 2D data to provide a plurality of input 2D feature data, wherein the preprocessing the plurality of input 2D data to provide the plurality of input 2D feature data is same as the preprocessing the reference 2D data to provide the reference 2D feature data;
transforming the plurality of input 2D feature data into a plurality of input 1D feature data comprising transforming an input 2D feature data into an input 1D feature data having a second 1D size, wherein the second input 1D size is same as or larger than the first 1D size, and wherein the transforming the input 2D feature data into the input 1D feature data is same as the transforming the reference 2D feature data into the reference 1D feature data; and
searching for a transformed input 1D feature data of the plurality of input 1D feature data that matches the transformed reference 1D feature data;
wherein the searching comprises following steps:
(a) the reference 1D feature data comprises a first feature and a second feature;
(b) the first feature is searched consecutively in the plurality of input 1D data starting from a first input 1D feature data of the plurality of input 1D feature data, until the first feature matches a feature of a pixel in a (1+p)-th input 1D feature data of the plurality of input 1D feature data, wherein p is a positive integer (p≥0);
(c) the second feature is searched consecutively in the plurality of input 1D data starting from the (1+p)-th input 1D feature data, until the second feature matches a feature of a pixel of a (1+p+q)-th input 1D feature data of the plurality of input 1D feature data, wherein q is a positive integer (q≥0);
(d) repeat step (b) and step (c) by searching consecutively the first feature in the plurality of input 1D data starting from the (1+p+q)-th input 1D feature data, until both the first and second features are matched features of two pixels of a same r-th input 1D feature data of the plurality of input 1D feature data, r is a non-zero positive integer (r≥1);
(e) positions of the two pixels of the same r-th input 1D feature data are verified whether the positions match positions of the first and second features in the reference 2D feature data.

14. The computer method of claim 13, wherein the transformed 1D order comprises selecting pixels following steps:

Steps 1-$n$: $0 \leq i \leq (n-1)$, select $x=0$ and $y=i-x$; $x=1$ and $y=i-x$; $x=2$ and $y=i-x$; ...; until $y=0$; $i$: integer; and Steps $(n+1)$-$(n+m-1)$: $1 \leq j \leq (m-1)$, select $x=j$ and $y=m-x+j-2$; $x=j+1$ and $y=m-x+j-2$; $x=j+2$ and $y=m-x+j-2$; ... until $x=m-1$; $j$: integer wherein (m,n) is the first 2D size.

15. The computer method of claim 13, wherein the transformed 1D order comprises selecting pixels following steps:

Steps 1-$n$: $0 \leq i \leq (n-1)$, select $x=0$ and $y=i$; $x=1$ and $y=i$; $x=2$ and $y=i$; ...; until $x=m-1$ and $y=i$; $i$: integer;

wherein (m,n) is the first 2D size.

* * * * *